(12) United States Patent
Gross

(10) Patent No.: US 7,781,109 B2
(45) Date of Patent: Aug. 24, 2010

(54) HYDROGEN STORAGE AND INTEGRATED FUEL CELL ASSEMBLY

(76) Inventor: Karl J. Gross, 33902 Juliet Cir., Fremont, CA (US) 94555

( * ) Notice: Subject to any disclaimer, the term of this patent is extended or adjusted under 35 U.S.C. 154(b) by 0 days.

(21) Appl. No.: 10/934,340

(22) Filed: Sep. 3, 2004

(65) Prior Publication Data

US 2006/0051638 A1 Mar. 9, 2006

(51) Int. Cl.
*H01M 8/04* (2006.01)
*H01M 8/24* (2006.01)
*C01B 3/00* (2006.01)

(52) U.S. Cl. ................... 429/408; 429/462; 429/505; 429/513; 429/515

(58) Field of Classification Search .............. None
See application file for complete search history.

(56) References Cited

U.S. PATENT DOCUMENTS

| | | | |
|---|---|---|---|
| 3,664,873 A | 5/1972 | Buswell et al. ........... 136/86 C |
| 4,393,924 A | 7/1983 | Asami et al. ........... 165/104.12 |
| 4,771,823 A | 9/1988 | Chan ........................ 165/61 |
| 5,314,762 A | 5/1994 | Hamada et al. ............... 429/37 |
| 5,391,366 A | 2/1995 | Yamamoto et al. | |
| 5,512,145 A | 4/1996 | Hollenberg ................. 205/628 |
| 5,862,855 A | 1/1999 | Balk .................... 165/104.12 |
| 6,057,051 A | 5/2000 | Uchida et al. ................ 429/19 |
| 6,305,442 B1 | 10/2001 | Ovshinsky et al. .......... 141/231 |
| 6,358,488 B1 | 3/2002 | Suda ........................ 423/657 |
| 6,447,945 B1 | 9/2002 | Streckert et al. .............. 429/34 |
| 6,586,124 B2 * | 7/2003 | Kelley et al. ................. 429/17 |
| 6,746,496 B1 | 6/2004 | Kravitz et al. .............. 48/118.5 |
| 6,748,748 B2 | 6/2004 | Bradley et al. ............... 62/46.1 |
| 2002/0064692 A1* | 5/2002 | Johnson ....................... 429/11 |
| 2002/0100682 A1 | 8/2002 | Kelley et al. ................ 204/266 |
| 2002/0119353 A1 | 8/2002 | Edlund et al. ................. 429/19 |
| 2002/0162693 A1 * | 11/2002 | Mizuno et al. ............. 180/65.1 |
| 2002/0182459 A1* | 12/2002 | Hockaday et al. ............. 429/19 |
| 2003/0049502 A1 | 3/2003 | Dickman et al. .............. 429/20 |
| 2003/0054215 A1* | 3/2003 | Doshi et al. .................. 429/26 |
| 2003/0150218 A1 | 8/2003 | Ovshinsky et al. .......... 62/46.3 |
| 2003/0162074 A1 | 8/2003 | Menjak et al. ................ 429/37 |
| 2003/0198846 A1 | 10/2003 | Franklin ...................... 429/25 |
| 2004/0031591 A1 | 2/2004 | Myasnikov et al. ..... 165/104.12 |
| 2004/0072049 A1* | 4/2004 | Becerra et al. ................ 429/34 |

* cited by examiner

*Primary Examiner*—John S Maples
(74) *Attorney, Agent, or Firm*—Steven R. Vosen

(57) ABSTRACT

Hydrogen is stored in materials that absorb and desorb hydrogen with temperature dependent rates. A housing is provided that allows for the storage of one or more types of hydrogen-storage materials in close thermal proximity to a fuel cell stack. This arrangement, which includes alternating fuel cell stack and hydrogen-storage units, allows for close thermal matching of the hydrogen storage material and the fuel cell stack. Also, the present invention allows for tailoring of the hydrogen delivery by mixing different materials in one unit. Thermal insulation alternatively allows for a highly efficient unit. Individual power modules including one fuel cell stack surrounded by a pair of hydrogen-storage units allows for distribution of power throughout a vehicle or other electric power consuming devices.

55 Claims, 15 Drawing Sheets

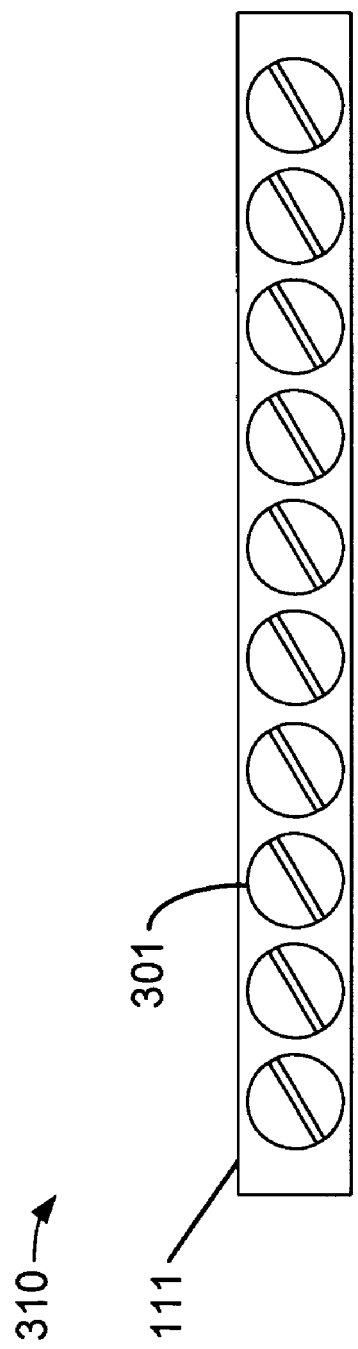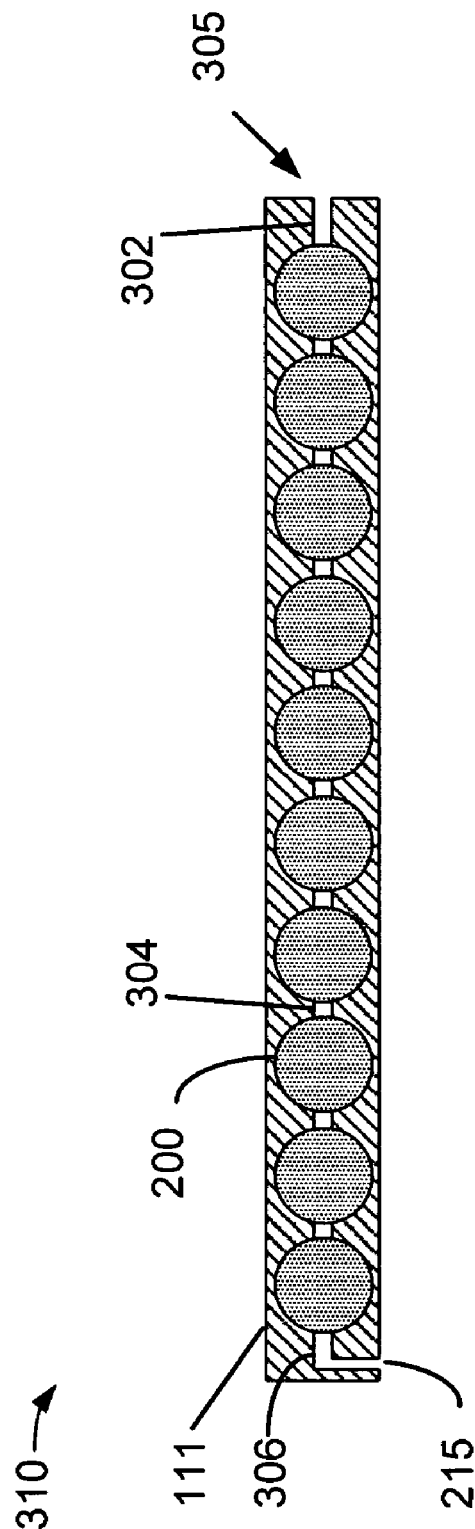

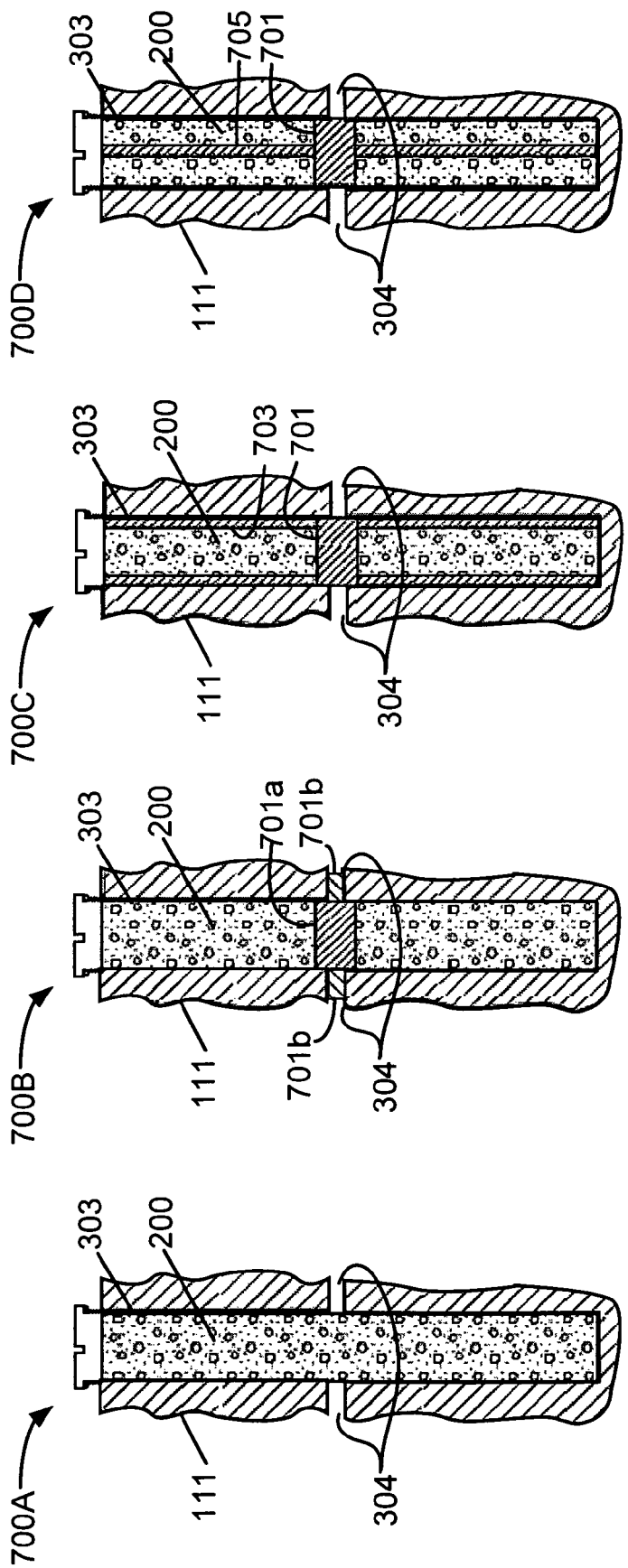

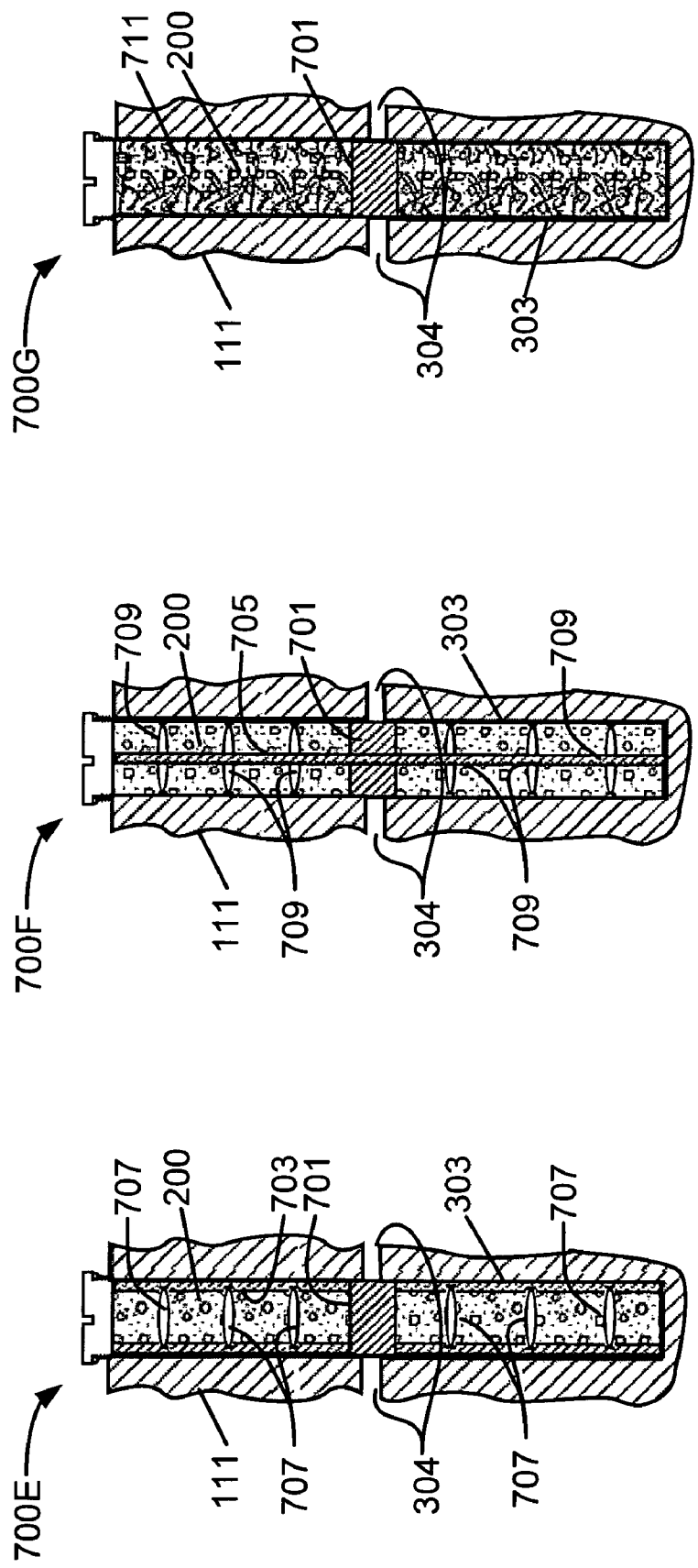

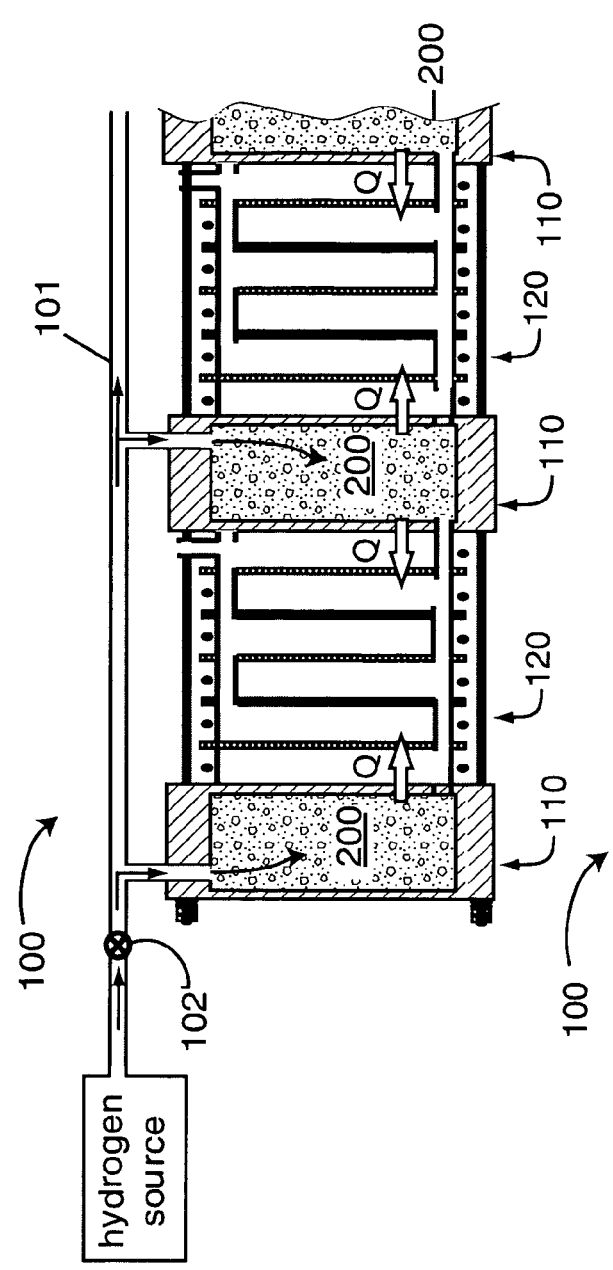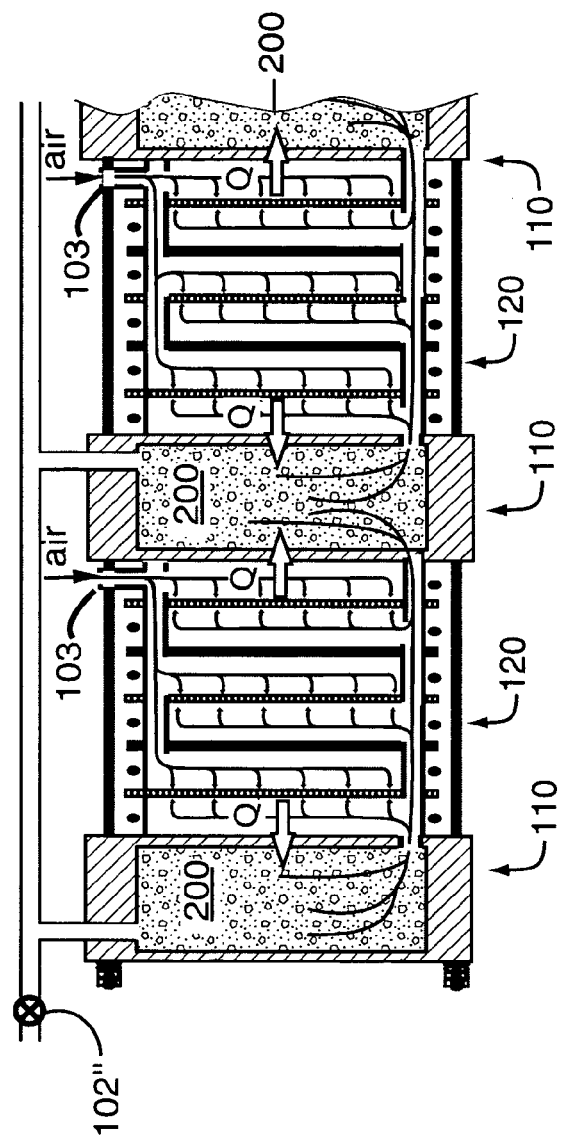
FIG. 8A
FIG. 8B

HYDROGEN STORAGE AND INTEGRATED FUEL CELL ASSEMBLY

STATEMENT REGARDING FEDERALLY SPONSORED RESEARCH OR DEVELOPMENT

The United States Government has rights in this invention pursuant to Contract No. DE-AC04-94AL85000 between the United States Department of Energy and the Sandia Corporation for the operation of the Sandia National Laboratories.

BACKGROUND OF THE INVENTION

1. Field of the Invention

The present invention generally relates to hydrogen storage, and more particularly to a system including hydrogen storage and hydrogen consuming devices, such as fuel cells.

2. Discussion of the Background

The use of fuel cells for power generation and transportation has the potential to provide an efficient and relatively environmentally benign alternative to conventional, combustion-based systems. Since most fuel cells operate on hydrogen, an import component of a fuel cell system is a hydrogen-storage unit to provide the fuel cell hydrogen on demand. Hydrogen is a gas under ambient conditions and has a small volumetric energy density, and as such hydrogen storage is problematic. Much development work has focused on providing hydrogen storage technologies with the capability to store of hydrogen at volumetric energy densities that exceed that of the gas at standard conditions. In addition, it is important that a hydrogen-storage device is economically viable, that it is lightweight, that it does not contaminate or otherwise interfere with fuel cell operation, and that it can be easily recharged.

One device for storing hydrogen is provided by tanks that can operate at pressures as high as 10,000 psi (69 MPa). One problem with tanks is that hydrogen is and can easily diffuse through metals, especially under high pressure, presenting flammability or explosion safety risks. Many tank materials cannot stand up to hydrogen diffusion at high pressures for a long period of time. In addition, high-pressure tanks are generally heavy and bulky, resulting in a large penalty, especially for transportation applications. Finally, hydrogen stored at high pressures presents safety risks associated with a catastrophic release of the compression energy of the gas.

Another device for stores hydrogen as a liquid at cryogenic temperatures. These devices are rather cumbersome and have very high energy penalties associated with liquefying the hydrogen. Because it is necessary to maintain the liquid hydrogen at a temperature of 20 K, there are efficiency and safety problems associated with the evaporation of hydrogen that occurs under normal conditions.

Yet another device for storing hydrogen includes materials that store hydrogen by sorption. One example of this type of material are hydrides, such as magnesium and magnesium-based alloys, that chemically bind with hydrogen as an interstitial compound, or hydrogen containing compounds such as complex hydrides and amide/imides. As an example, metal hydrides absorb hydrogen to form a solid that can release the hydrogen as a gas. Hydrogen can also be stored by physisorption of molecular hydrogen on high-surface area materials such as carbon and metal-organic-frameworks. In addition hydrogen can be stored in hydrogen containing compounds that are reacted with other compounds to release the hydrogen. An example of this type of material uses the reaction of $NaBH_4$ with water. Although high pressures and extreme temperatures are not necessarily required for these materials to store hydrogen, many of the proposed hydrogen-storage materials systems are generally heavier than the hydrogen gas and liquid storage systems, and thus weight is an issue.

Thermal management is also an issue with fuel cells and with metal hydrides. Fuel cells usually operate best at greater than ambient temperatures and produce waste heat. Hydrides generate or require heat depending on how they are used. Thus, for example, the absorption of hydrogen by a metal hydride is normally exothermic, resulting in the heating of the hydride, and the desorption of hydrogen is normally endothermic, resulting in the cooling of the hydride. In addition, the absorption and desorption rates usually increase with temperature. From a safety perspective this behavior is desirable—hydrogen evolution from the hydride reduces the hydride temperature, and thus reduces the further desorption of hydrogen. When large amounts of hydrogen are required, however, heat must be supplied to the fuel storage unit to maintain high desorption rates. Another problem with metal hydrides and many other hydrogen-storage materials is that desorption typically requires about a sixth of the chemical energy available in the hydrogen, reducing the power available from a fuel cell-metal hydride system.

A new class of complex materials has recently been proposed for hydrogen storage. These materials, referred to herein as "decomposition-recombination materials," or "D-R materials," which release hydrogen by the decomposition into other compounds or elements with different stoichiometies of the non-hydrogen elements, and which will reversibly re-combine into the original compound upon hydrogen uptake. Thus, for example, alkali-earth-aluminum hydride (an "alanate") such as $NaAlH_4$ release hydrogen by decomposing into $Na_3AlH_6$, Al, and $H_2$, and $Mg_2FeH_6$ releases hydrogen by decomposing into $MgH_2$, Fe, and $H_2$.

While D-R materials have the potential to store more hydrogen per unit volume with a smaller mass of material than classic metal hydrides, there are several difficulties involved with the use of D-R materials. First, as with metal hydrides, the uptake and evolution of hydrogen from a bed of D-R materials requires that the heat flow into the bed is sufficient to produce a sufficient flow of hydrogen, and that the heat flow out of the bed is sufficient to rapidly take up hydrogen upon charging. Second, D-R materials require temperatures higher that that of classic metal hydride fuel storage units, on the order of 80° C. or more. The elevated temperature requirement is the result of the kinetics of the reaction processes and possibly associated with the diffusion of decomposition components of the D-R materials. Thus, in the example of the alanates $NaAlH_4$, some Al and/or Na species must diffuse over distances which are large on the atomic scale. This is in contrast, for example, with metal hydrides that include metal alloys that do not necessarily decompose. In solid/gas reactions the diffusion of reaction species is slow at room temperature and is more rapid as the temperature is increased. The use of beds of D-R materials for storing hydrogen is thus limited, in part, by thermal considerations.

Thermal management in prior art fuel cell systems using hydrides typically uses a heat transfer medium to provide the required heat transfer. Thus, for example, one prior art system circulates water between the fuel cell and fuel storage unit. This presents several problems. First pumping the water adds addition complexity, cost and energy penalties to the system. Second, water can be corrosive to the fuel cell and fuel storage unit housing, and is also highly reactive with some hydrides.

To realize the potential increased hydrogen storage capabilities in a fuel cell system, one or more of the following problems must be solved. First, the heat flow through a hydrogen-storage material should be sufficient to meet the storage and delivery requirement of the fuel cell-hydrogen storage system. Second, fuel cell and the hydrogen-storage material temperatures should be maintained at levels that provides for optimum performance. Third, the hydrogen-storage unit should be economical and require ancillary power or other needs that are less than those of current fuel storage units.

BRIEF SUMMARY OF THE INVENTION

The present invention overcomes the disadvantages of prior art by providing for hydrogen storage that allows for improved heat transfer into and out of a hydrogen-storage material. In one embodiment of the present invention, the hydrogen-storage material is segmented into internal volumes that allows for tailoring of the hydrogen storage capabilities and easy replacement of materials.

It is one aspect of the present invention to provide an apparatus for storing hydrogen. The apparatus includes a housing having at least one internal volume and at least one passageway through the housing and from the internal volumes. At least one internal volume includes a first material for absorbing hydrogen and a second material having a higher thermal conductivity than the first material. In one embodiment, the first material includes at least two materials for absorbing hydrogen. In another embodiment, the second material is selected from the group consisting of a sintered metal, a metal foam, and a metal wool. In yet another embodiment, an internal volume also includes a spring that may take the form of a flexible diaphragm. In yet another embodiment, a porous material restricts the flow to filter the hydrogen and act to distribute the gas flow. The hydrogen-storage materials can be mixed within the volume, or can be segregated into different internal volumes.

It is another aspect of the present invention to provide a fuel cell-hydrogen storage system that has improved thermal matching of the fuel cell and hydrogen-storage material.

It is yet another aspect of the present invention to provide a plurality of fuel cell stacks alternately disposed between a plurality of hydrogen-storage units.

It is one aspect of the present invention to provide an apparatus including a fuel cell stack operable on hydrogen, and at least one housing in thermal contact with a substantial portion of one side of said fuel cell stack, and having at least one internal volume for storing hydrogen and a passageway from said at least one internal volume to said fuel cell stack. The heat for releasing hydrogen from said at least one internal volume to the fuel cell stack is at least partially provided by heat generated in said fuel cell stack. In one embodiment, thermal insulation surrounds at least a portion of the fuel cell stack and housing. In another embodiment, the housing provides a gap for circulating a gas to control the heat transfer from the fuel cell stack and housing.

It is another aspect of the present invention to provide an apparatus including a fuel cell stack operable on hydrogen, at least one housing in thermal contact with a substantial portion of one side of said fuel cell stack and having at least one internal volume for storing hydrogen and a passageway from said at least one internal volume to said fuel cell stack, and a device to control heat transfer from said fuel cell stack and said at least one housing. The heat for releasing hydrogen from said at least one internal volume to the fuel cell stack is at least partially provided by thermal conduction of heat generated in said fuel cell stack.

It is yet another aspect of the present invention to provide an electric power system including two or more electric power modules each electrically connected to at least one other of said two or more electric power modules. Each of said electric power modules includes a fuel cell stack operable on hydrogen, and at least one housing in thermal contact with said fuel cell and having one or more internal volumes for storing hydrogen and an outlet to provide hydrogen released from said one or more internal volume to said fuel cell. The heat for releasing hydrogen is at least partially provided by said fuel cell is at least partially provided by thermal conduction of heat generated in said fuel cell stack. The electric power modules can be wired together to provide power to operate a device requiring electric power.

These features together with the various ancillary provisions and features which will become apparent to those skilled in the art from the following detailed description, are attained by the exercise device of the present invention, embodiments thereof being shown with reference to the accompanying drawings, by way of example only, wherein:

BRIEF DESCRIPTION OF THE SEVERAL VIEWS OF THE DRAWING

FIG. 4 is a top view of a second embodiment fuel storage unit housing of the present invention;

FIG. 5A is a top sectional view of a second embodiment hydrogen bed housing of the present invention;

FIG. 6A is a sectional end view 3-3 and FIG. 6B is a sectional top view 6B-6B of FIG. 6A;

FIGS. 7A-7G is a sectional end view 3-3 of FIG. 2 showing several embodiments of individual volumes of a fuel storage unit;

FIG. 8A shows the details of FIG. 2 with the system charging with hydrogen;

FIG. 8B shows the details of FIG. 2 with the system producing power;

FIG. 11 is a series configuration, FIG. 12 is a parallel configuration, and FIG. 13 is a combined series/parallel configuration;

Reference symbols are used in the Figures to indicate certain components, aspects or features shown therein, with

DETAILED DESCRIPTION OF THE INVENTION

Figure 1:
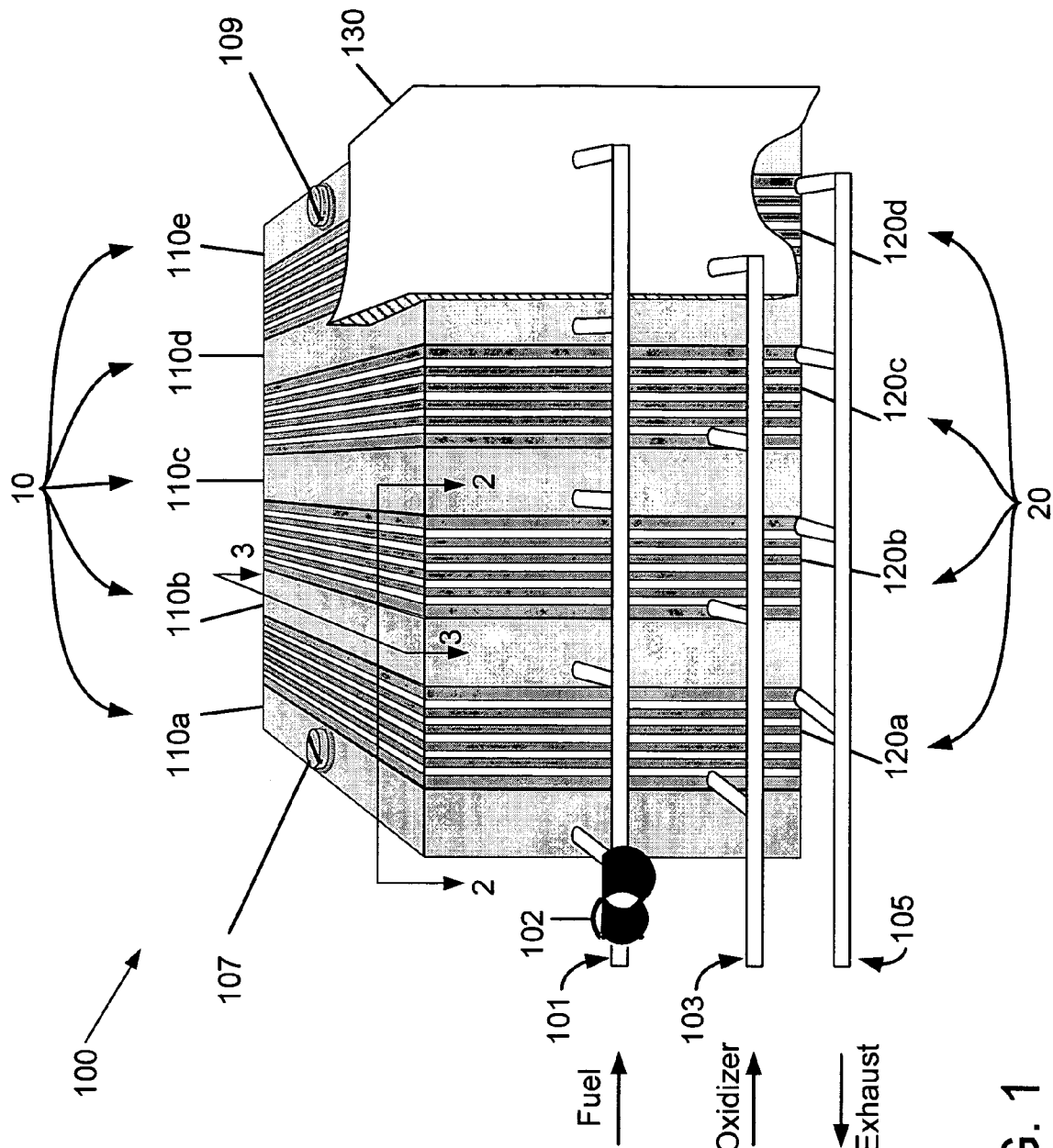
FIG. 1 is a schematic perspective view of a first embodiment integrated fuel cell system of the present invention.

FIG. 1 is a schematic perspective view of a first embodiment integrated hydrogen-powered electricity-producing system 100 of the present invention. System 100 includes hydrogen-storage assembly 10 and fuel cell assembly 20 and provides for electrical connections as an anode 107 and cathode 109. Hydrogen for system 100 is provided by a fuel supply line 101 to controllably provide hydrogen to fuel storage assembly 10, and the oxidizer for the system is provided by an oxidizer supply line 103. In one embodiment, the oxidizer is the oxygen in air, and that air under pressure is delivered to oxidizer supply line 103. Exhaust products from the reaction of fuel and oxidizer, principally water and waste or unused gases, are removed from system 100 through an exhaust line 105.

The flow of hydrogen gas from fuel supply line 101 into fuel storage assembly 10 is controlled by one or more valves 102. In one embodiment of the present invention, a single valve 102 controls the flow of all of the hydrogen in to fuel storage assembly 10. In an alternative embodiment, fuel storage assembly 10 is partitioned into two or more fuel storage subassemblies that having flow controlled by different valves 102. In another alternative embodiment, valves 102 are disconnect valves, allowing system 100 to be included into a mobile system, for example, and used in much the same way as a battery.

Fuel cell assembly 20 is preferably, though not limited to, an assembly of polymer electrolyte membrane (PEM) fuel cells or solid oxide fuel cells. Alternatively, the fuel cells in assembly 20 can be low-temperature PEM fuel cells, high-temperature PEM fuel cells, alkaline electrolyte fuel cells, phosphoric acid fuel cells, molten carbonate fuel cells, solid oxide fuel cells or any combination thereof.

Fuel storage assembly 10 and fuel cell assembly 20 are arranged to provide a large surface area of contact. Specifically, fuel storage assembly 10 includes several individual fuel storage units 110, indicated as 110a, 110b, 110c, 110d, and 110e, and fuel cell assembly 20 includes several individual fuel cell stacks 120, indicated as 120a, 120b, 120c, and 120d. Fuel storage units 110a, 110b, 110c, 110d, and 110e and fuel cell stacks 120a, 120b, 120c, and 120d are interleaved, with each fuel cell stack in contact with two fuel storage units. Thus, for example, fuel cell stack 120a is between fuel storage units 110a and 110b. The fuel storage assembly 10 may include any number of fuel storage units 110 and the fuel cell stacks 120 may contain any number of fuel cells.

The fuel storage units 110 may be of different types and the fuel cell stacks 120 may be of different types (for example high-temperature PEM and low-temperature PEM) each with equal or differing numbers of fuel cells. In one embodiment of the present invention, fuel storage units 110b, 110c, and 110d are identical 'internal components,' each in contact with two fuel cell stacks 120, and fuel storage units 110a and 110e are 'end components,' each in contact with only one of fuel cell stacks 120. This configuration results in a compact fuel storage unit/fuel cell system, and in a low thermal resistance between the fuel storage units and fuel cells. This configuration also results in an increase ratio of fuel storage unit to fuel cell stacks contact area versus free surface area, and in an increased heat transfer between fuel storage units and fuel cell stacks.

As described subsequently, hydrogen is supplied to each fuel storage unit 110, and the oxidizer is supplied through oxidizer supply line 103 to each fuel cell stack 120. Hydrogen stored in each fuel storage unit 110 is drawn upon by one or more fuel cell stacks 120 when needed. Specifically, as discussed subsequently, fuel cell stack 120 has channels to allow fuel from fuel storage unit 110 and the oxidizer from oxidizer supply line 103 to electrochemically react within each fuel cell stack 120, channels to direct water and waste gases to exhaust line 105, and electrical connections between the fuel cell stacks to system anode 107 and cathode 109.

In general, a fuel storage unit/fuel cell system of the present invention includes at least one individual fuel storage unit 110 and one fuel cell 120. Examples of embodiments of system 100 include, but are not limited to: a single fuel storage unit in contact with a single fuel cell (each being an end component); an alternating equal number of fuel storage units and fuel cells, with one fuel storage unit end component and one fuel cell end component; and alternating fuel storage units and fuel cells, either two fuel storage unit end components (as illustrated in FIG. 1) or two fuel cell end components.

As an optional component, system 100 includes an insulation layer 130, shown in a cut away view in FIG. 1, to retain some of the heat of system 100. Insulation layer 130, which covers some or all of system 100, is provided when the operating environment of system 100 and the optimal operating temperature of the system require reduced heat loss from system 100.

Figure 2:
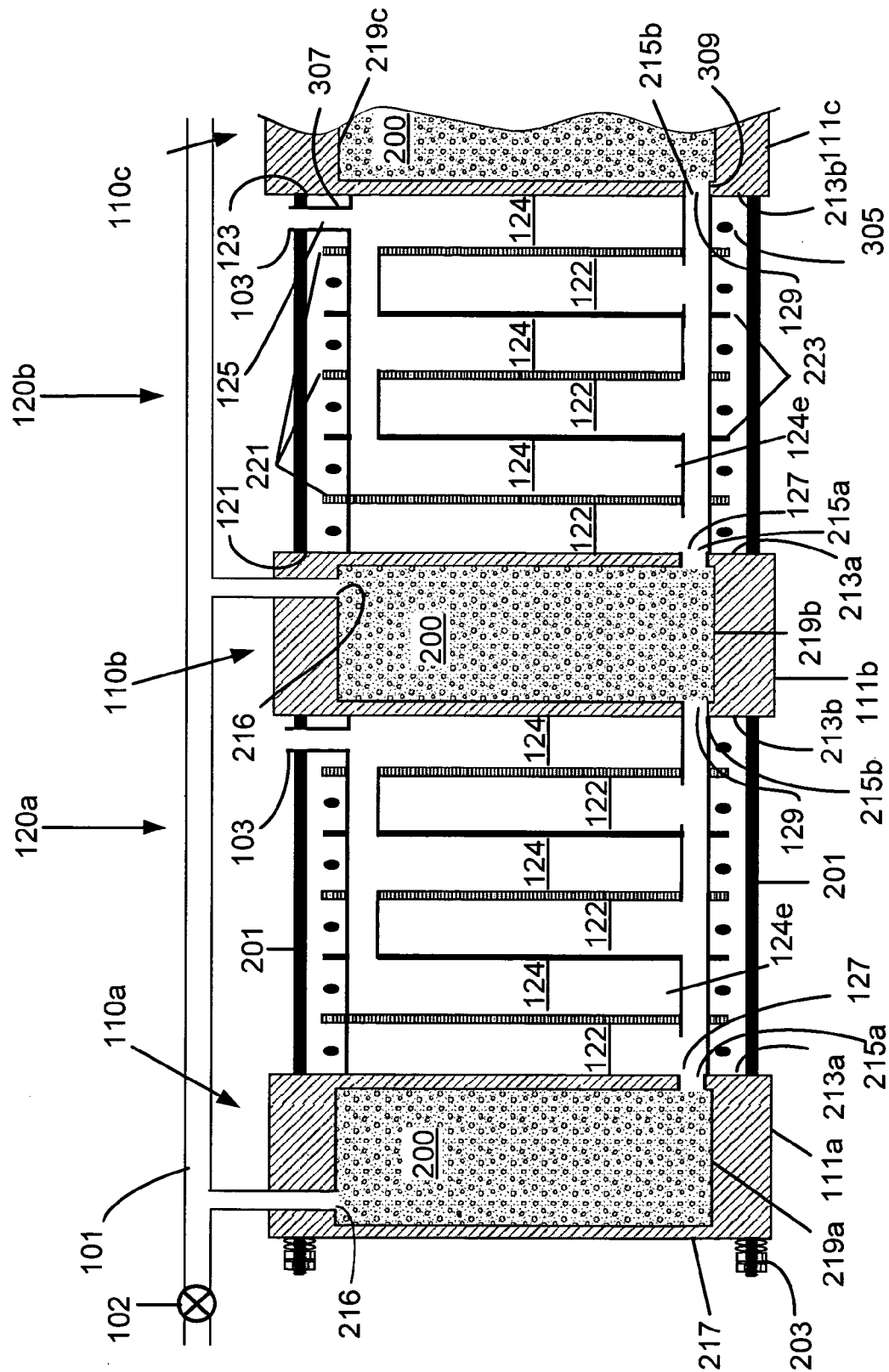
FIG. 2 is a sectional side view 2-2 of FIG. 1 showing an exploded schematic view of several hydride storage beds and fuel cells.

FIG. 2 is a sectional side view 2-2 of FIG. 1 showing fuel storage units 110a, 110b, and 110c, and exploded views of fuel cell stacks 120a and 120b. FIG. 2 illustrates the transfer of gas between fuel storage unit 110 and fuel cell 120 in one particular embodiment of the present invention, and is not meant to limit the scope of the claims. Each fuel storage unit 110 has a corresponding housing 111 with an open volume 219 that contains a hydrogen-storage material 200, one or more inlets 216, and one or more outlets 215, each on a face 213 facing one fuel storage units 110. Bolts 201 span across fuel storage assembly 10 and fuel cell assembly 20 to hold system 100 together. Housings 111 are preferably a metal, including but not limited to aluminum, light-weight metal alloys. Alternative embodiments of housings 111 include, but are not limited to, thermally conductive plastics and resins, solid carbon, carbon fiber, composite materials, vacuum, or thermally controlled insulating structures to provide high thermal conductivity between adjacent fuel cell stacks 120 and fuel storage units 110.

Hydrogen-storage material 200 can be one or more of a number of materials that store hydrogen, including, but not limited to hydrides, amides, imides, nanotubes and other adsorbants, glass microspheres, chemical hydrides, liquid or solid hydro-carbons and chemically reacting hydrogen containing compounds. Within the scope of the present invention, a phase change—that is liquid hydrogen—can also be a hydrogen-storage material. Each of these materials absorbs heat as they desorb hydrogen. The heat transfer into the fuel storage assembly 10 thus controls the amount of hydrogen that can be supplied by fuel storage assembly 10.

More generally, hydrogen-storage materials 200 within the scope of the present invention include, but are not limited to individual components or mixtures of the following components: hydrides, including but not limited to alanates (alkali-earth-aluminum hydrides), borohydrides, magnesium hydride, and intermetallic hydrides, including but not limited to rare-earth-nickel hydrides or aluminum hydride; hydrogen-containing compounds, including but not limited to amides, imides, metal hydrides, catalysts and alloys wherein hydrogen is taken-up and released though exothermic and endothermic chemical reactions between constituent components including but not limited to hydrogen; carbon-containing materials, including but not limited to activated carbon, carbon nanofibers or nanotubes, metal organic frameworks, or other high-surface-area hydrogen adsorption materials; and glass microspheres. Additional hydrogen-storage material components include mixtures of hydrogen-containing compound that releases hydrogen by exothermic reactions with a second compound, example of which include, but are not limited to borohydrides reacting with water and alkali-earth-aluminum hydrides reacting with ammonia. In addition, hydrogen storage that is also within the scope of the present invention includes using the internal volumes to store compressed gaseous or liquid hydrogen.

One type of material 200 are hydrides, including but not limited to a D-R material, such as an alanate, a metal hydride, or can be a mixture of different materials. Each housing 111 can contain a different amount, composition, mixture or density of material, as described subsequently. In particular, material 200 may be varied to combine, for example, low temperature properties of one material with the high temperature properties of another material to result in some required temperature dependent response and result, for example, with a fuel storage assembly 10 having good cold start properties or to optimize the thermal management of the combined system without additional active heat transfer.

In one embodiment of the present invention, a composite hydride, either by mixing the hydrides together or segregating them between volumes, is used to provide for rapid fill of the fuel storage unit. Specifically, the mixture of two or more hydride materials within one fuel storage unit is selected to provide a synergistic match between the thermodynamic and kinetic properties of the component hydrides, and thus to dramatically reduce hydrogen fill times to the order of minutes. For example, a low-temperature hydride such as a hydride from a rare earth (RE) as a RENi5-based hydride can be used to charge the system when the bed is at or near room temperature. The heat of the hydriding reaction is transferred through the storage unit, increasing the temperature of other hydrogen-storage materials that have better hydrogen absorbing properties at higher temperatures. Thus the heat of reaction of the low-temperature hydride is used to stimulate absorption by other hydrogen-storage component materials. In one alternative embodiment, hydrogen flow between volumes containing different materials or different mixtures of materials is controlled with passive or dynamically controlled valves.

In another alternative embodiment, one or more volumes 219 are filled with liquid phase alanates. The alanates differ from more conventional hydrides in that they melt at low temperature (182° C.). In this embodiment, housing 111 is heated to a temperature that allows for the free flow of the hydride into the bed at a hydrogen pressure sufficiently high to prevent decomposition of the alanate. Thus, for example, for the alanates $NaAlH_4$ at the melting temperature of 182° C., the hydrogen decomposition pressure is 120 atm. Thus the fuel storage unit could be loaded with molten alanates under a high hydrogen pressure allowing an easy method to fill complex or porous volumes with a hydrogen-storage material. In one embodiment, beds containing aluminum foam or thermally conductive metal, carbon or composite structures are provided to improve heat transfer to the hydride. These structures could be filled using liquid phase hydrogen-storage materials.

FIG. 2 illustrates one embodiment of the present invention as an exploded view of a PEM fuel cell stack. Each fuel cell 120a-120d has the same structure, with a pair of opposing faces 121 and 123 with openings 127 and 129, respectively, and an opening 125. Openings 127 and 129 are aligned with openings 215 and each provides a passage of hydrogen from one of fuel storage units 110 into the fuel cell. Opening 125 is connected to oxidizer supply line 103. Alternatively, there are two or more openings 125 to provide an oxidizer to fuel cell stack 120.

Each fuel cell stack 120 has an alternating structure of a Membrane Electrode Assembly (MEA) 221, where the electrochemical reaction of hydrogen and oxygen occurs, and a bipolar plate 223, where current collection and gas distribution occurs. The alternating fuel cell/hydride configuration of system 100 provides for flow from material 200 of each fuel storage unit into an adjacent fuel cell. Thus, for the embodiment of FIG. 2, fuel cell 120a has opening 127 aligned with outlet 215a of fuel storage unit 110a and opening 129 aligned with outlet 215b of fuel storage unit 110b, and fuel cell 120b has opening 127 aligned with outlet 215a of fuel storage unit 110b and opening 129 aligned with outlet 215b of fuel storage unit 110c.

The MEAs 221 and bipolar plates 223 have openings that form a gas distribution system to allow oxygen within the air provided at opening 125 into space 124 and hydrogen from openings 127 and 129 onto space 122. In addition, space 124 has an end 124e that is in fluid communication with exhaust line 105. Thus, for example, surface 213a of fuel storage unit 110a and surface 213b of fuel storage unit 110b provide hydrogen through from openings 127 and 129, respectively, into space 122, while oxygen within the air is provided at opening 125 into space 124. These gas distribution systems could be integral to housing 111 or separate plates for this purpose. Exhaust from fuel cells 120 includes the water resulting from combining oxygen and hydrogen that diffuses through the MEAs 221 into space 124 as well as unused components from the air, such as nitrogen and any unused oxygen. The exhaust is collected from space 124 and passes through end 124e into exhaust line 105.

Bipolar plates 223 allow electric charge transfer between MEA's 221 to provide an anode at face 121 and a cathode at face 123. Seals 305 are positioned between adjacent MEAs 221 and bipolar plates 223 to prevent gas from leaking away from fuel cell 120. Several bolts 210 pass through holes (not shown) in fuel storage units 110 with a nut 203 or other tightening mechanism to hold system 100 together.

In another alternative embodiment the integrated fuel storage unit/fuel cell stack design is used for heat transfer using mixed-fuel fuel cells in which hydrogen or methanol is mixed with air or an oxidizer and supplied to both the anode and cathode side of MEA's containing selective catalysts.

System 100 provides electrical connections to fuel cell stacks 120 through fuel storage units 110 by having housings 111 in electrical connection to adjoining fuel cells. Alternatively, housings 111 are electrically isolated from fuel cells stacks 120, and electric contacts are provided directly to the ends of the fuel cell stack.

Figure 3A:
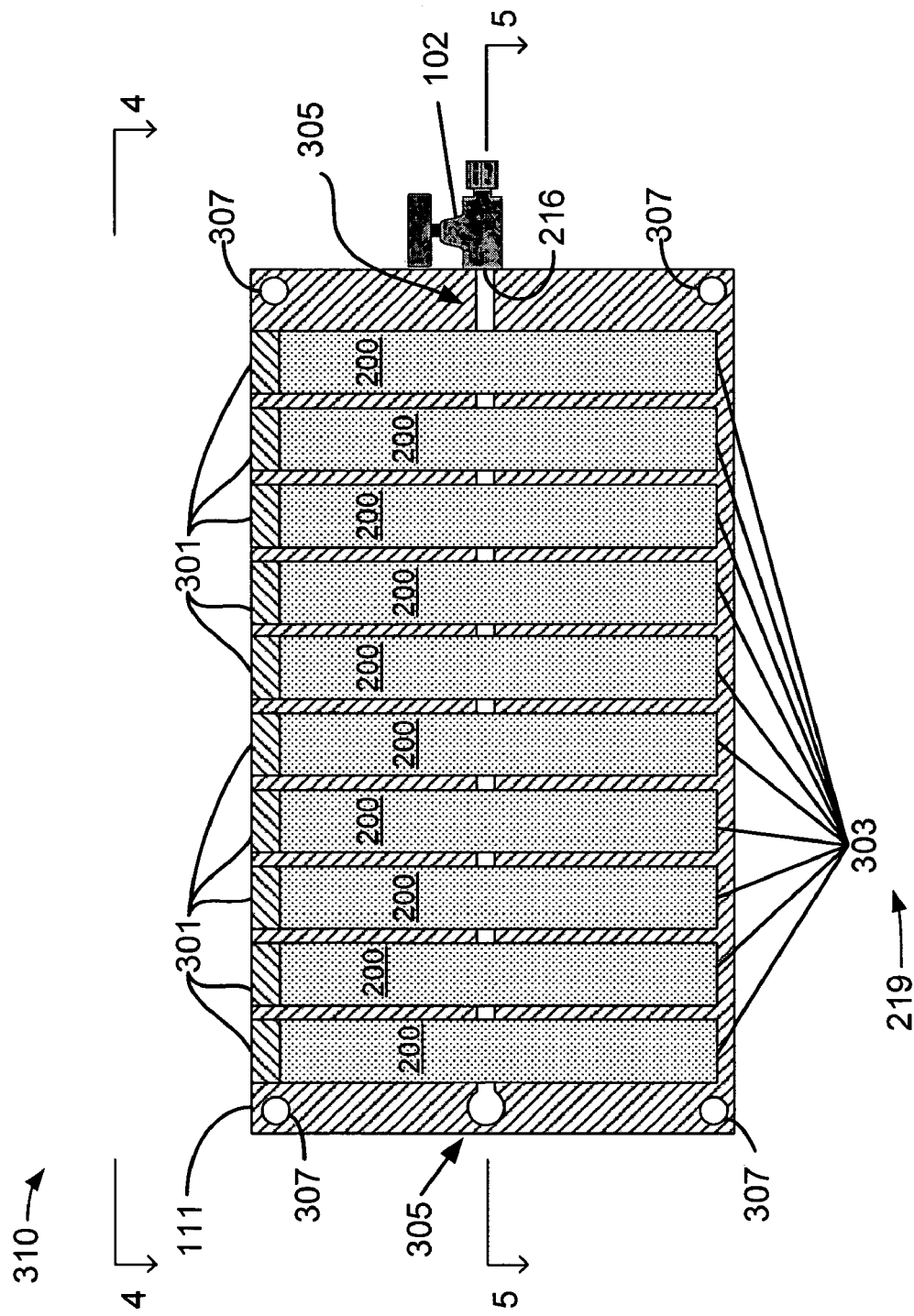
FIG. 3A is a sectional end view 3-3 of FIG. 1 showing details of a second embodiment fuel storage unit housing and fuel storage unit of the present invention.
Figure 3B:
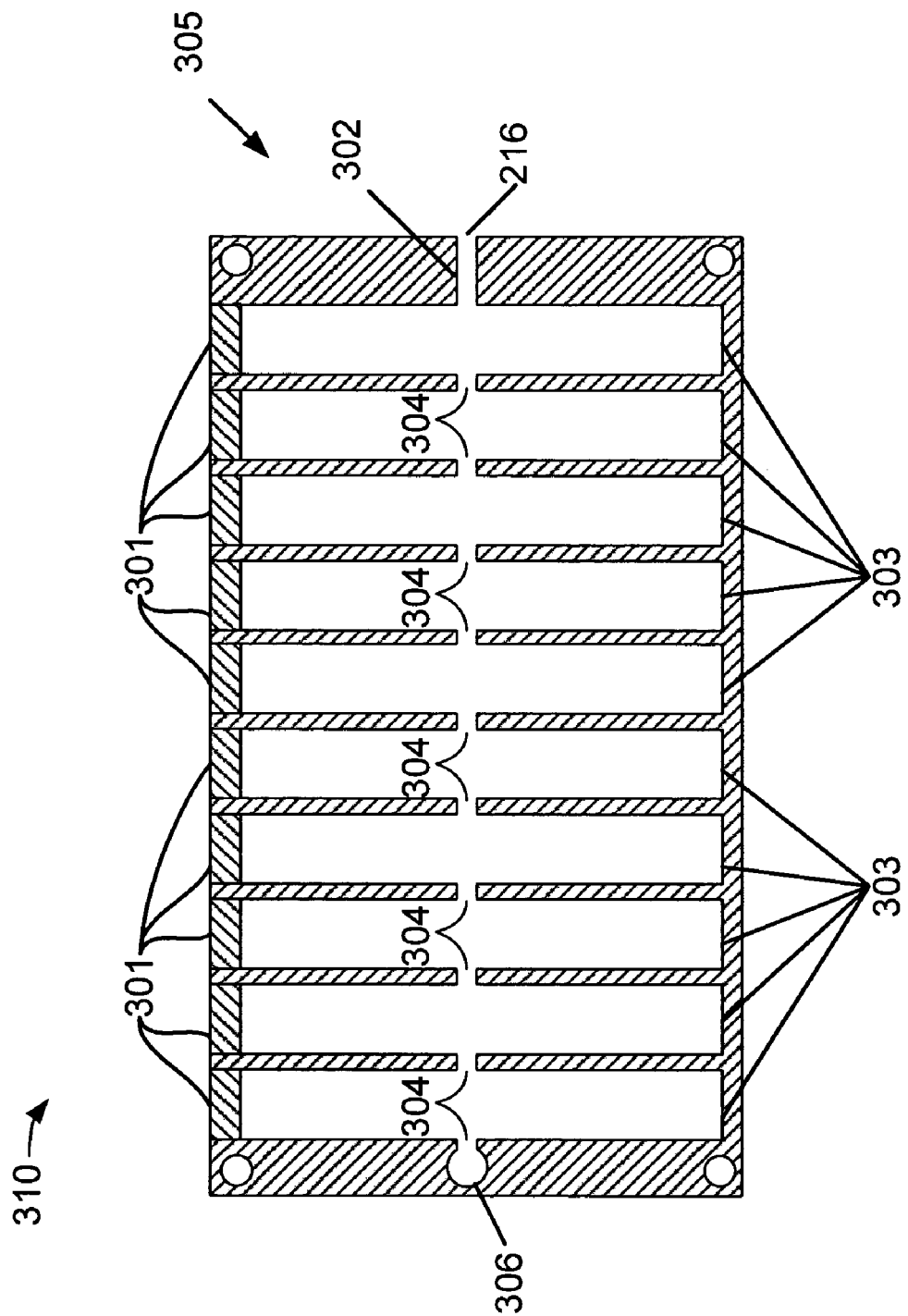
FIG. 3B is a sectional end view 3-3 of FIG. 1 showing details of a second embodiment fuel storage unit housing of the present invention.

A second embodiment fuel storage unit 310 is shown in FIG. 3A as the sectional end view 3-3 of FIG. 1, in sectional end view FIG. 3B of the fuel storage unit without a material 200, in FIG. 4 as a top view 4-4, and in FIG. 5A as a top sectional view 5-5. Fuel storage unit 310 may, in various embodiments, be generally similar to any one or more of the embodiments of fuel storage unit 110 disclosed herein, except as further discussed below, and may be used to provide hydrogen to fuel cell stacks 120, as described herein. Fuel storage unit 310 has volume 219 in housing 111 which includes several cylindrical volumes 303 each having a cover 301 and connected by passageways 305. As is shown in FIGS. 3A, 3B and 5A, passageways 305 connect volume 219 to inlet 216 and outlet 215, and includes passages 304 that connect cylindrical volumes 303, a passage 302 that extends to inlet 216 and a passage 306 that extends to outlet 215. The partitioning of volume 219 into smaller volumes 303 allows for the tailoring of material 200 and better heat transfer in fuel storage unit 310.

In one embodiment, volumes 303 are an array of similarly shaped volumes having circular cross-sections, and that cover 301 is preferably removable, such as a threaded plug, or alternatively a welded plate. Circular cross sections provide superior strength for loading the materials under high pressure. Passageways 304 and 305 are formed from smaller holes bored cross-wise to the length of volumes 303 to provide a route for hydrogen flow. Partitioning the material between several cylindrical volumes also helps control the distribution of hydrogen-storage materials through the fuel storage unit, and also allows for the easy replacement of portions of the material due, for example, to mechanical degradation from repeated absorption-desorption of the hydride.

Figure 5B:
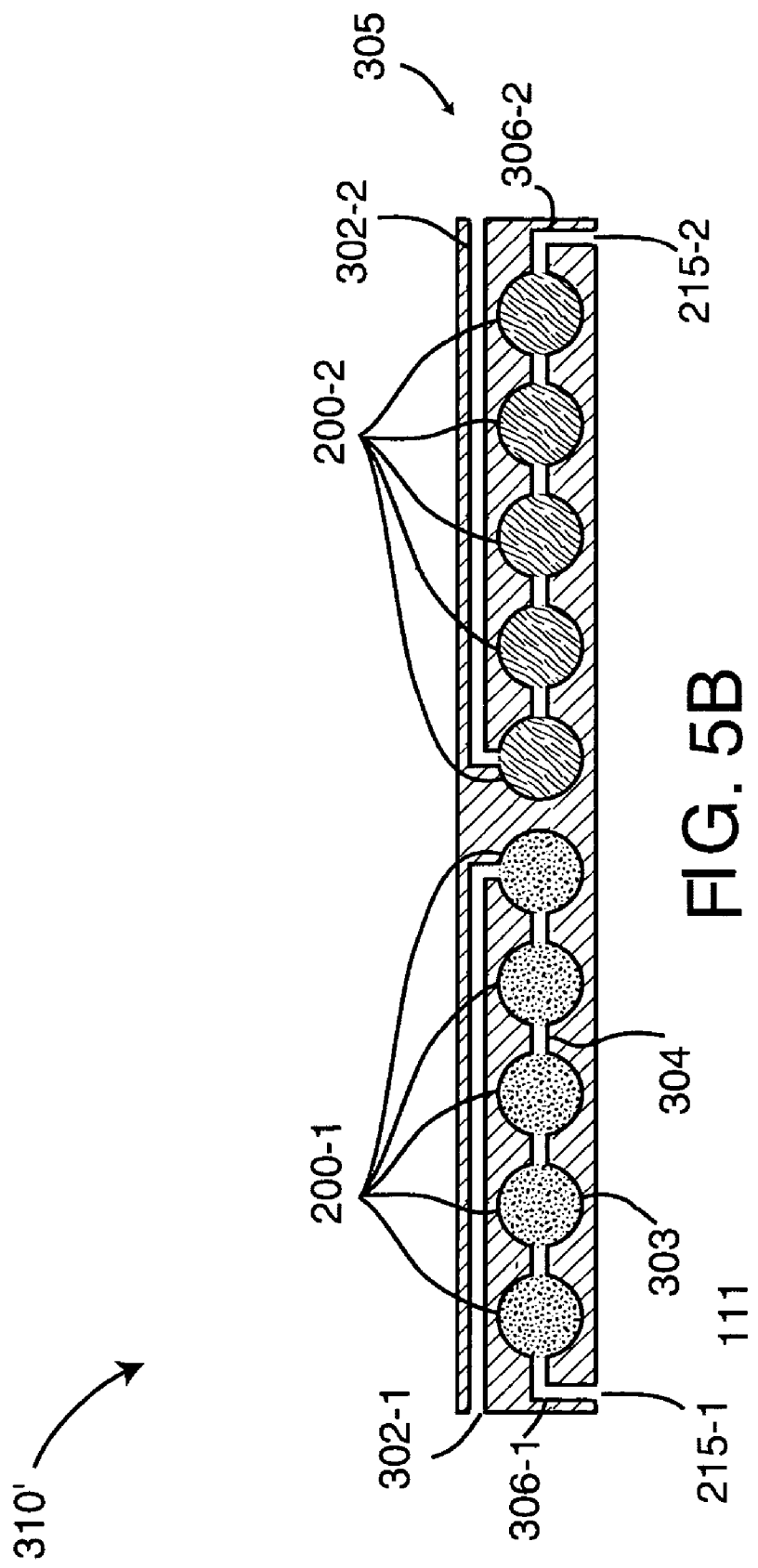
FIG. 5B is a top sectional view of a third embodiment hydrogen bed housing of the present invention.

A third embodiment fuel storage unit 310' is shown in the FIG. 5B as a top sectional view 5-5 of FIG. 3A. Fuel storage unit 310' may, in various embodiments, be generally similar to any one or more of the embodiments of fuel storage units 110 or 310 disclosed herein, except as further discussed below, and may be used to provide hydrogen to fuel cell stacks 120 as described herein. Fuel storage unit 310' has volumes 303 with two different hydrogen-storage materials, indicated as material 200-1 and material 200-2, with a different set of interconnections for each. Thus each volume 303 containing material 200-1 is connected to the hydrogen supply through a passageway 302-1 and to an outlet 215-1 through a passageway 306-1. Each volume 303 containing material 200-2 is connected to the hydrogen supply through a passageway 302-2 and to an outlet 215-2 through a passageway 306-2. Preferably each passageway 302-1 and 302-2 has a controllable valve to allow the flow of hydrogen into the two different materials 200-1 and 200-2 to be separately controlled.

Figure 6B:
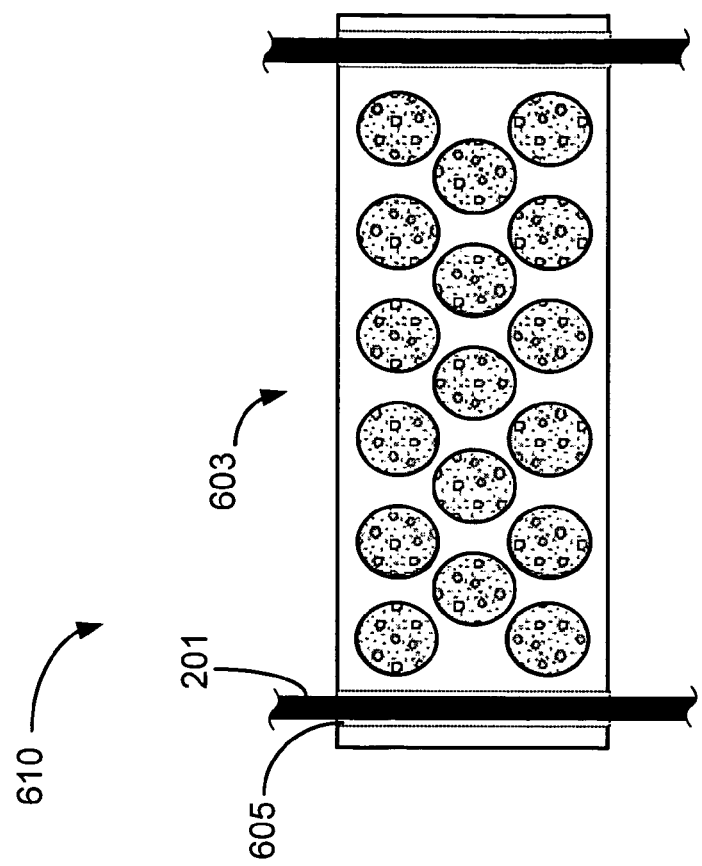
FIGS. 6A and 6B show a fourth embodiment fuel storage unit housing of the present invention having close-packed cylindrical fuel storage units, where
Figure 6A:
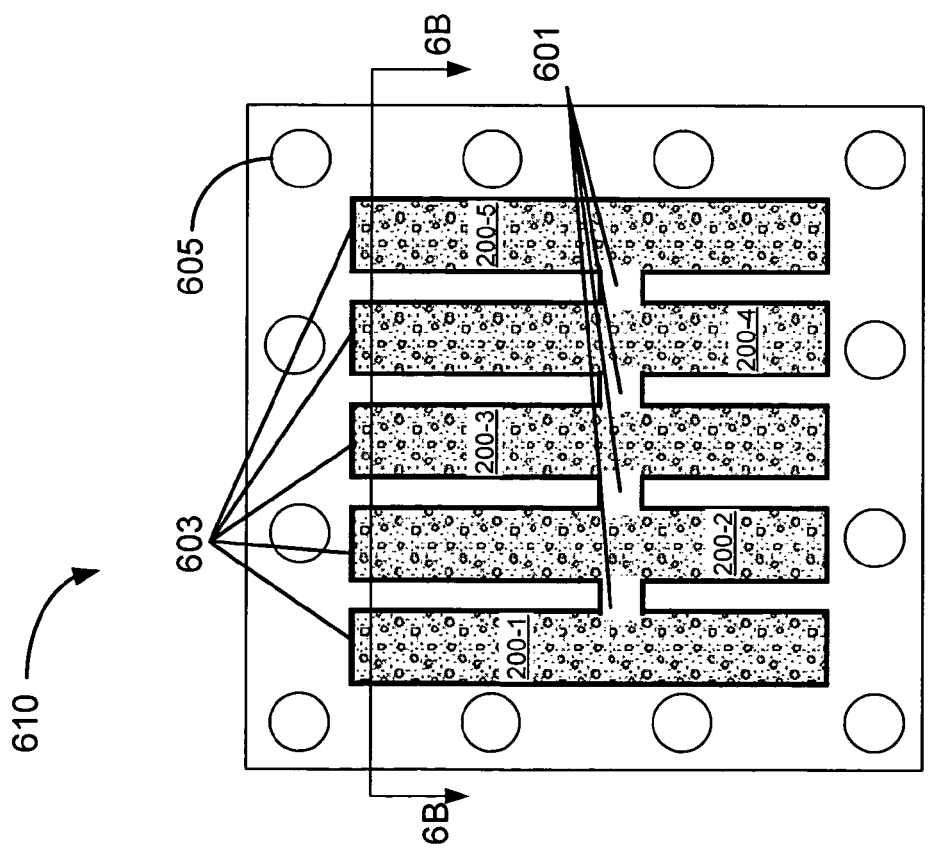

A fourth embodiment fuel storage unit 610 is shown in FIG. 6A as a sectional end view 3-3 and FIG. 6B is a sectional top view 6B-6B of FIG. 6A. Fuel storage unit 610 may, in various embodiments, be generally similar to any one or more of the embodiments of fuel storage units 110, 310, or 310' disclosed herein, except as further discussed below, and may be used to provide hydrogen to fuel cell stacks 120 as described herein. Fuel storage unit 610 includes a two-dimensional array of cylindrical volumes 603 connected by passageways 601, holes 605 for accepting bolts 201. As in fuel storage unit 310, passageways 601 connect all volumes 603 to inlet 216 and outlet 215. In addition volumes 603 can have different hydrogen-storage materials, indicated explicitly as materials 200-1, 200-2, 200-3, 200-4, and 200-5.

In one embodiment, material 200 includes different hydrides in different volumes 303 or 603 to tailor the thermal performance of fuel storage assembly 10. Thus, for example, fuel storage unit 110 can have some volumes 303 or 603 containing "room temperature" metal hydrides, such as AB5 hydrides (MmNi$_5$) (where A refers to a strong hydride forming element and B to a weak hydride forming element), AB (Ti, Fe, Mn) or AB2 (Ti, Zr, Mn, Fe) hydrides that desorb at relatively low temperatures, and other sub-volumes containing D-R materials, such as complex hydrides, which include NaAlH$_4$ and Mg$_2$FeH$_6$ that can contain more hydrogen by weight but that desorbs hydrogen at a higher temperature. Alternatively, one or more volumes, such as volumes 303 or 603 can contain a mixture of hydrides in the same volume. In one embodiment, alanates are provided in two-thirds of volumes 303, and a hydride, including but not limited to AB2 or AB5 is provided in the remaining one-third of the volumes. At start-up hydrogen is delivered to the fuel cell from the room temperature hydride. As the storage system heats up, using the waste heat of the fuel cell, the kinetics of hydrogen desorption from the decomposition-recombination material will increase and it will then provide the bulk of the stored hydrogen.

Another embodiment of the present invention that provides for the use of high-temperature fuel cells is a material 200 that includes mixtures of hydrogen-containing compounds that release hydrogen by exothermic reactions with a second compound. Thus, for example, borohydrides react with water to release hydrogen and heat. The release of heat from this reaction allows for starting the high-temperature PEM and other fuel cells that will not run well until they are heated up to higher than ambient temperature.

There are many packing configurations of material 200 in individual cylindrical volumes 303, as shown, for example, in the embodiments of FIGS. 7A-7G as hydride packings 700A-700G, respectively. In general, these packings provide for hydrogen flow into and out of fuel storage unit 110, while keeping material 200 within the fuel storage unit, and also provides for improved heat transfer between the hydride material and housing 111. The present invention provides, for example, using one or any combination of packings 700A-700E within fuel storage assembly 10, for example with individual volumes 303 within a particular fuel storage assembly having the same or different packings.

In packing 700A (FIG. 7A) material 200 fills volume 303. In packing 700B, a filter material 701 is provided near passages 304 to prevent material 200 from being transported out of volume 303. Specifically, a packing 701$a$ is placed within column 303, a packing 701$b$ is placed within passageway 304, or packings 701$a$ and 701$b$ can both be provided. Packing material 701$a$ is preferably a fritted filter such as porous sintered powder, or a course wool, including but not limited to, stainless steel, aluminum copper, brass, glass, aluminum oxide or other oxides. Packing material 701$b$ is preferably a fritted filter rod, including but not limited to stainless steel, aluminum copper, brass, glass, aluminum oxide or other oxides. Packing material 701 is also provided in packings 700C-700G as shown in FIGS. 7C-7G, respectively.

In packings 700C and 700E (FIGS. 7C and 7E, respectively), filter material 703 is provided surrounding material 200 (FIG. 7C). Materials for filter material 703 include, but are not limited to materials 701$a$ or a fritted cylindrical tube. In packings 700D and 700F packing material 705 is preferably, but not limited to, a material 701$a$ or 701$b$ in the form of a fritted rod.

Springs can also be added to the packings to keep material 200 in contact with the walls of volume 303 and to prevent the migration and/or compaction of the hydrogen-storage materials. Hydrides expand upon absorption of hydrogen and contract upon desorption of hydrogen, and thus there is some movement of hydride material 200 within volume 303. This movement can cause loss of thermal contact with the walls of volume 303. In addition, material 200 can become compacted and interlocked if not segregated, and then on absorbing hydrogen the material 200 can expand exerting great forces on volume 303. These forces can cause the fuel storage assembly 10 to rupture. FIG. 7E illustrates packing 700E having several springs 707 distributed along the length of hydride material 200 to push the hydride material against the walls of volume 303 for better thermal contact, to provide additional heat transfer to walls of volume 303, to prevent migration and compacting of the material 200, and to take up the expansion forces of the material 200 on hydrogen absorption. The form of the spring includes, but is not limited to, two disks of metal bowing away from each other. FIG. 7F illustrates packing 700F having springs 709 with holes through their centers to accommodate the central filter 705. Another packing 700G is illustrated in FIG. 7G as having material 200 interspersed with a material 711 such as a powder mobility barrier fiber or foam to provide added heat transfer and prevent material migration. Examples of material 711 include, but are not limited to, a fiber, wool, foam, including, but not limited to, carbon, metal, metal coated oxide fibers, foams, wool or flakes.

The operation of system 100, for example as shown in FIG. 2, is illustrated in greater detail in FIGS. 8A and 8B, where FIG. 8A shows the details of the system charging with hydrogen, and FIG. 8B shows the details of the system producing power. To charge system 100, as in FIG. 8A, valve 102' is opened to high-pressure hydrogen to flow from a source through fuel supply line 101 into each fuel storage unit 110, which reacts with the hydrogen according to the pressure and temperature of material 200 and the amount of hydrogen on the fuel storage unit. When fuel storage units 110 are charged, valve 102' is closed. To produce electric power from system 100, oxygen in air, pure oxygen, or another oxidizing gas, is supplied to each fuel cell stack 120, and hydrogen desorbed from fuel storage unit 110 and flows into fuel cell stacks 120 according to the pressure and temperature of material 200 and the amount of hydrogen on the fuel storage unit.

As is known in the art, many hydrogen-storage materials, including most of those discussed previously, absorb hydrogen in an exothermic reaction. As such, the uptake of hydrogen into the fuel storage unit results in an increase of the hydrogen-storage material temperature or, alternatively, heat flow out of the hydrogen-storage material is required to maintain the hydrogen-storage material temperature. Hydrogen-storage materials desorb hydrogen in an endothermic reaction. Hydrogen release from a hydrogen-storage material thus results in a decrease of the hydrogen-storage material temperature or, alternatively, heat flow into the hydrogen storage is required to maintain the hydrogen storage temperature. In general, the rate of absorption and desorption are temperature dependent, with higher rates at higher temperature. To provide for a high hydrogen release rate, it is thus advantageous to provide heat to the hydrogen-storage material.

FIGS. 8A and 8B also illustrate the flow of heat between fuel cells stacks 120 and fuel storage units 110 in system 100 as arrows labeled "Q." The indicated heat flow improves the performance of system 100, and it is understood that heat may also flow in other directions in addition to those indicated. Housing 111 is preferably, but not limited to, a metal or other material that provides good heat flow into material 200. During the charging of fuel storage units 110, heat is released from material 200, and heat flows from hydride material 200 into fuel cells stacks 120, heating the fuel cells (FIG. 8A). During the operation of system 100 to generate electric power, waste heat is generated in fuel cells 120 as a result of the combination of hydrogen and oxygen within the fuel cells and material 200 is endothermically desorbing hydrogen. As indicated in FIG. 8B, heat flows from fuel cell stacks 120 into fuel storage units 110, simultaneously allowing for the necessary cooling of the fuel cells and the necessary addition of heat to material 200 for the desorption of hydrogen.

When generating power, heat generated in fuel cell assembly 20 is provided, principally by thermal conduction, into fuel storage assembly 10. Since fuel storage assembly 10 requires the addition of heat for the continued desorption of hydrogen, the intimate thermal contact of hydride and fuel cell is symbiotic and results in a high system efficiency.

In one embodiment of the present invention, materials 200 are alanates or amides and fuel cell stacks 120 are high-temperature PEM fuel cells, including but not limited to polymer electrolyte membranes that operate in the 80° C. to 250° C. range. Alanates require temperatures of 80° C. or higher to deliver hydrogen to a fuel cell at useful rates, a temperature that is near the most efficient operating temperature of high-temperature PEM fuel cells. Similarly, amides require temperatures in the 150-250° C. range. System 100 can maintain alanates or amides at these temperatures from the waste heat from the high-temperature PEM fuel cell. The direct transfer of waste heat from fuel cell to hydride provides for an efficient use of energy released from the hydrogen.

Figure 10:
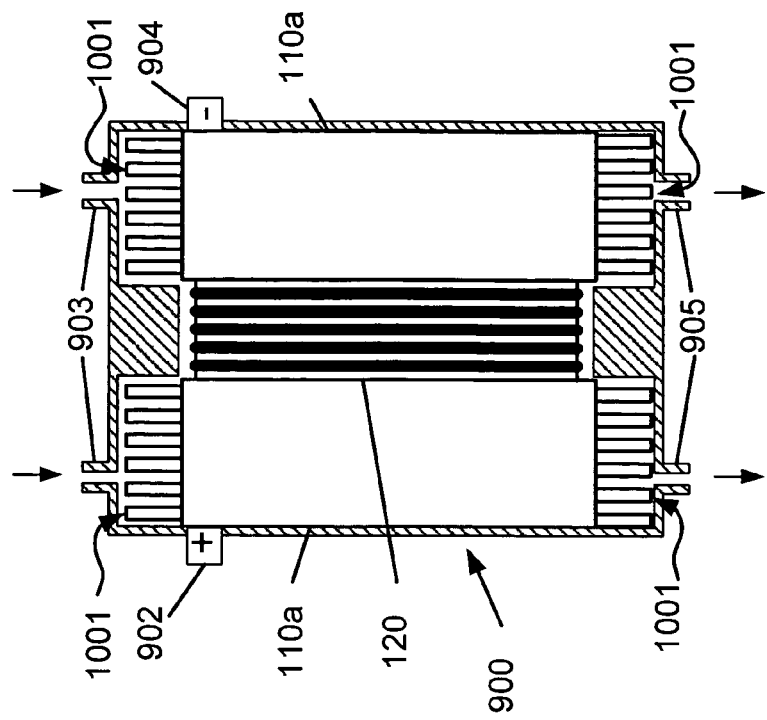
FIG. 10 is a side view 10-10 of the second embodiment system with the insulation cut-away.
Figure 9:
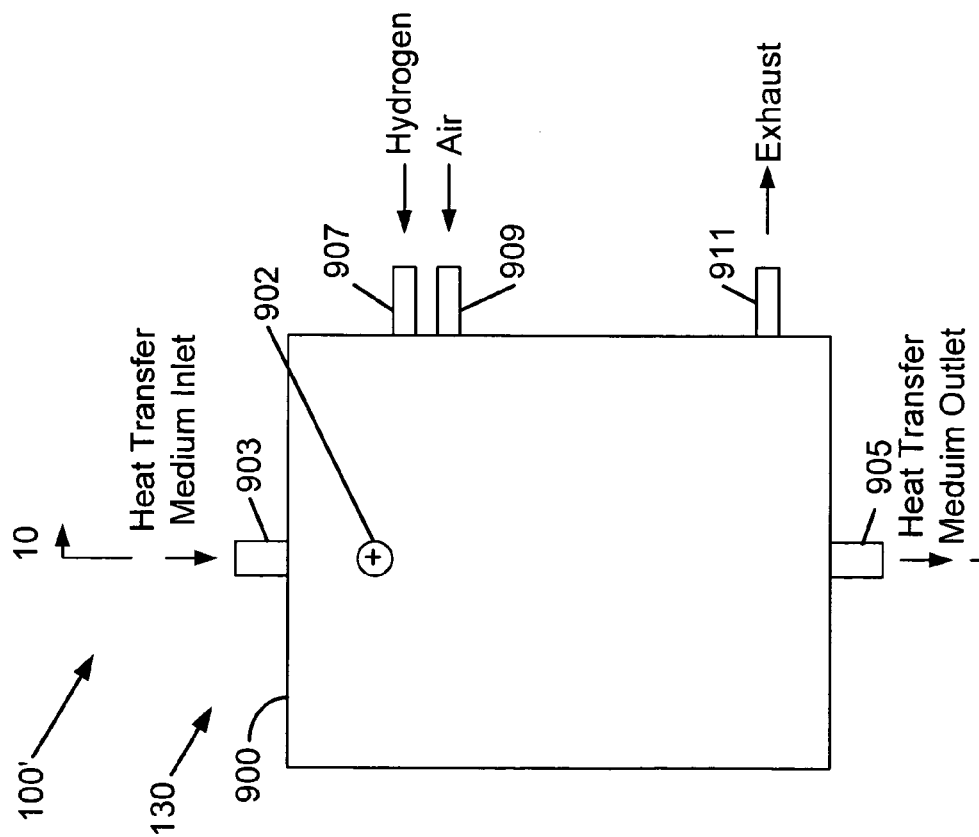
FIG. 9 is a side view of a second embodiment system having insulation.

A second embodiment integrated hydrogen-powered electricity-producing system 100' is shown in the side view FIG. 9 and sectional side view FIG. 10 as having insulation layer 130 formed from a jacket 900 and having a heat transfer medium inlet 903, a heat transfer medium outlet 905, a hydrogen inlet 907, an air inlet 909, a water and waste gas outlet 911, a cathode 902, and an anode 904. System 100' is a power module that can be used either as a single unit, or that can be combined to form a larger power system, as described subsequently. FIG. 10 is a sectional side view of jacket 900 containing a thermal insulation that surrounds fuel cell 120 and pair of fuel storage units 110a, one on either side of the fuel cell stack, and fins 1001 protruding from each fuel storage unit 110a and are in contact with the heat transfer medium. As described subsequently, the heat transfer medium flowing from inlet 903 and to outlet 905, jacket 900, and fins 1001 provide for active heat transfer control of the fuel storage units.

The control of flow of heat transfer medium through jacket 900 allows for the heating or cooling of the fuel storage units, and thus provides for controlling the temperature of system 100'. Due to the temperature dependency of the efficiency of fuel cells and the operating characteristics of hydrides, an elevated temperature delivers better system performance. Thus, for example, when fuel cell 120 is a high temperature PEM fuel cell, and material 200 includes an alanates such as $NaAlH_4$ or $Na_3AlH_6$, an operating temperature of 150° C. to 170° C. is preferable. By providing heating or cooling air through heat transfer medium inlet 903, an operating temperature of 50° C. to 250° C. can be maintained. In the most efficient operation most if not all of the heat would be provided by the waste heat of the fuel cell.

Alternatively, jacket 900 can surround a larger number of fuel cells and hydrides in alternating configurations, as discussed with reference to FIG. 2, fuel storage units 110 can include either a single volume or several volumes, such as volume 303 or 603 with the same or different materials 200 or packings 700. An alternative heat transfer system can be provided by a vacuum, or a controlled vacuum system, such as the gas-gap system described in U.S. Pat. No. 4,771,823, incorporated herein by reference. In another embodiment such gas-gap systems can be positioned between the fuel storage units 110 and fuel cell stacks 120 to control the flow of heat between the fuel storage units 110 and fuel cell stacks 120.

Figure 11:
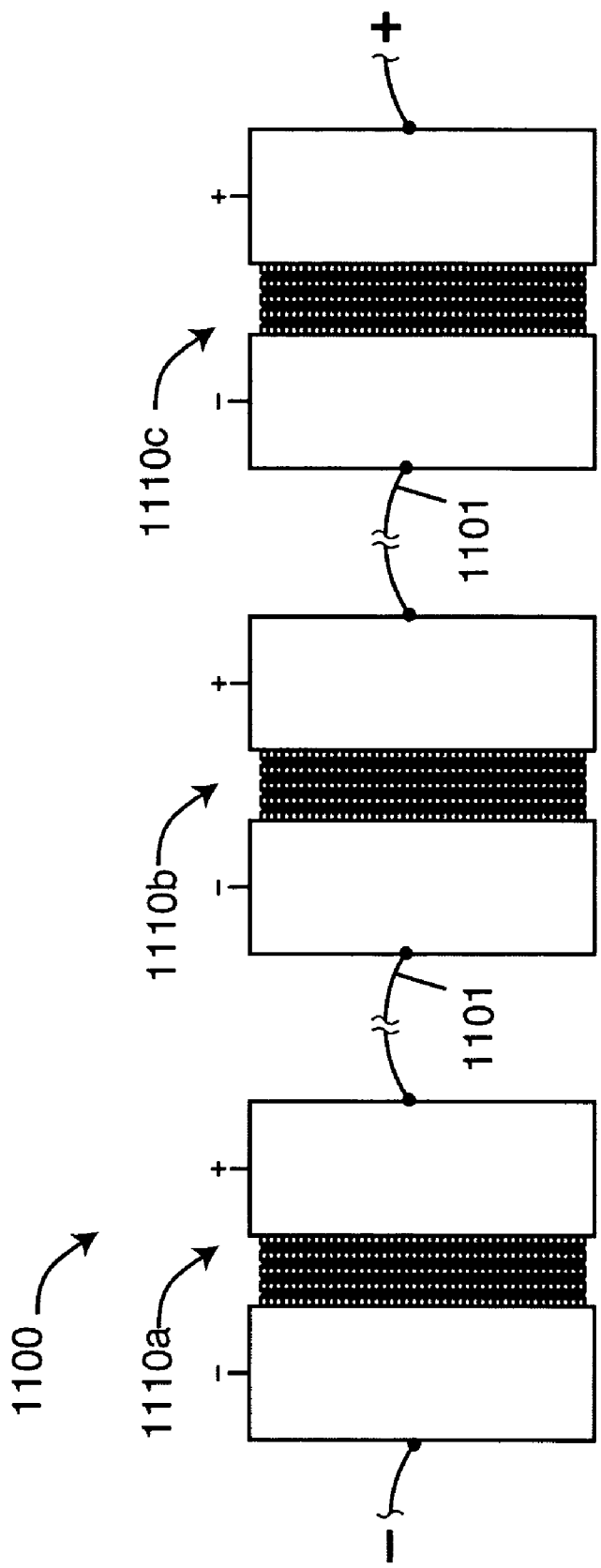
FIGS. 11-13 illustrate alternate configurations of wiring individual second embodiment systems, where
Figures 12, 13:
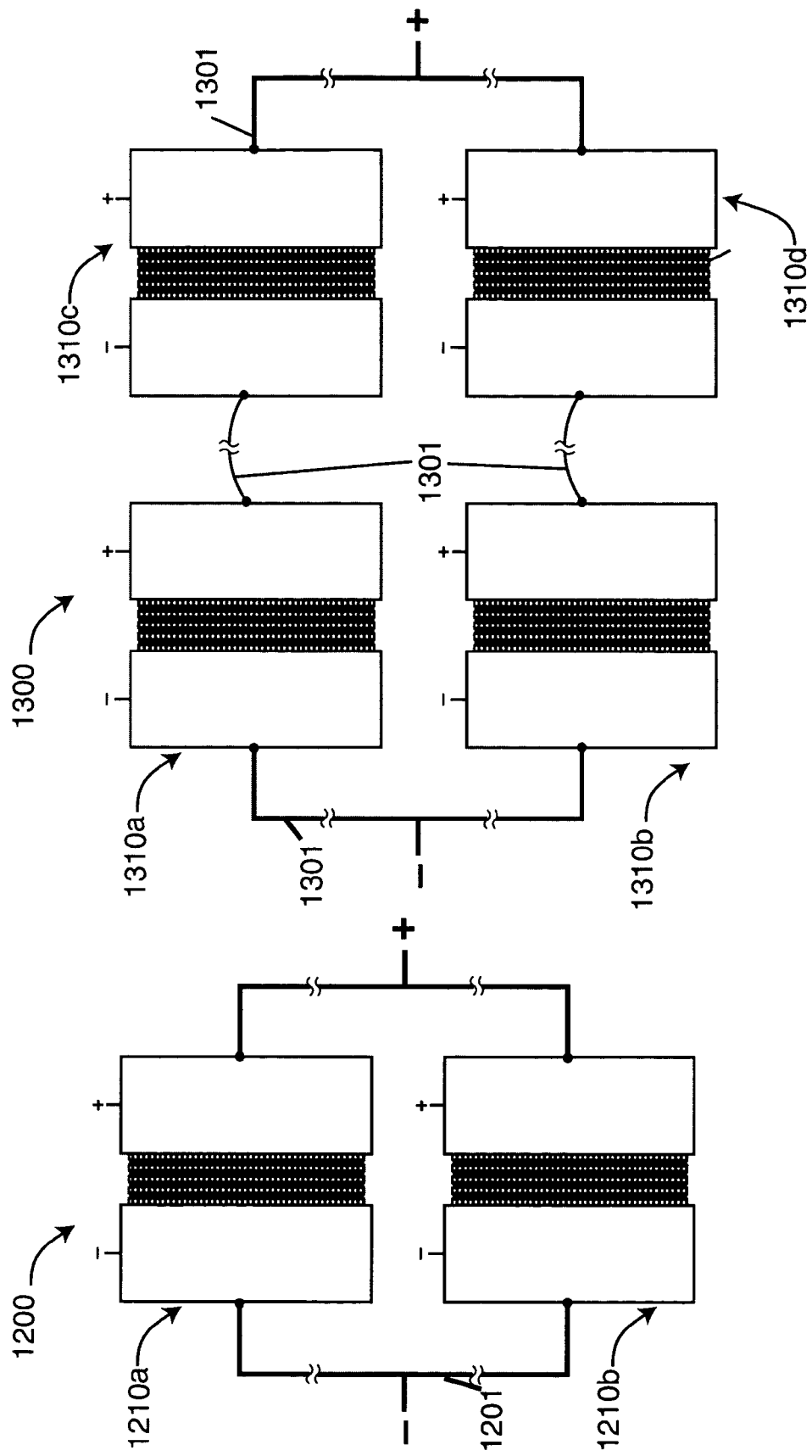

Individual integrated hydrogen power systems can be electrically connected, for example, as illustrated in the electrical connections of FIG. 11-13, to provided required electrical characteristics. FIG. 11 illustrates a series configuration 1100 of individual hydrogen-powered systems 1110, indicated as systems 1110a and 1110b, electrically connected with wiring 1101. FIG. 12 is a parallel configuration 1200 of individual hydrogen-powered systems 1210, indicated as systems 1210a, 1210b, and 1210c, electrically connected with wiring 1201.

The parallel and series electrical connection of hydrogen-powered systems can be combined to produce required electrical characteristics. Thus, for example, FIG. 13 is a combined series/parallel configuration 1300 of individual hydrogen-powered systems 1310, indicated as systems 1310a, 1310b, 1310c, and 1310d, with wiring 1301.

Each systems 1110, 1210, and 1310 may, in various embodiments, be generally similar to any one or more of the embodiments of systems 100 or 100' disclosed herein. Thus, for example, each system 1110, 1210, and 1310 includes, in general, hydrogen-storage assembly 10 and fuel cell assembly 20, as disclosed herein. Thus, for example, in one embodiment of configuration 1100, systems 1110a, 1110b and 1110c are identical. In another embodiment of configuration 1100, two or more of systems 1110a, 1110b and 1110c have, for example, different fuel storage units 110 and fuel cell stacks 120, a different number of fuel storage units 110 or fuel cell stacks 120 different hydrogen-storage assemblies 10, or different insulation layers 130, including one system having an insulation layer and another not having an insulation layer.

Configurations 1100, 1200, and 1300 allow for assembling power systems that are more distributed than in prior art fuel cell systems. Thus, for example, instead of having one or a small number of fuel cell stacks to power an automobile, configurations 1100, 1200, and 1300 efficiently provide for the fuel cells to be placed wherever space permits.

The modular configurations illustrated, for example, in FIGS. 11-13 allow for the more efficient use of space in many applications including, but not limited to, vehicles. In addition, the modular nature of these configurations allow the operation of one or more of the individual integrated hydrogen-powered systems, including but not limited to systems 1110, 1210, and 1310, in a manner more efficient at any given time depending on the demand for power.

Hydrogen-powered systems of the present invention, including but not limited to systems 100, 100', 1110, 1210, and 1310, can also be used in much the same manner as a battery. Thus, for example, an individual hydrogen-powered system, such as system 1310a, can be recharged in place. Alternatively, one hydrogen-powered system, such as a single system 100, or a group of two or more individual hydrogen-powered systems, such as systems 1110a and 1110b, can be physically coupled and removably mounted within a power-consuming device, allowing for replacement of depleted systems with charged systems and the external recharging of depleted systems for further use in the same or a different device.

Figure 14B:
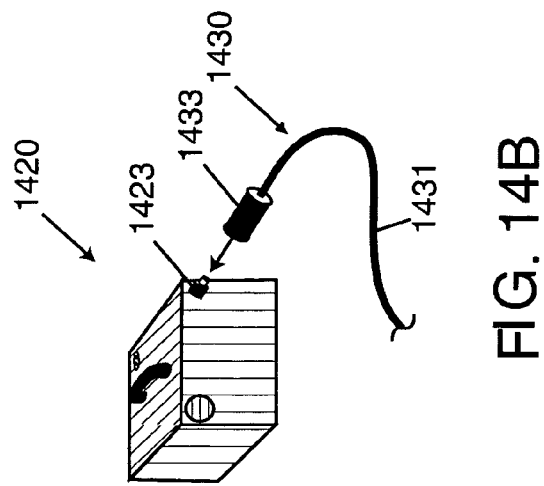
FIG. 14B is a perspective view of the fuel cell system of FIG. 14B removed for refilling.
Figure 14A:
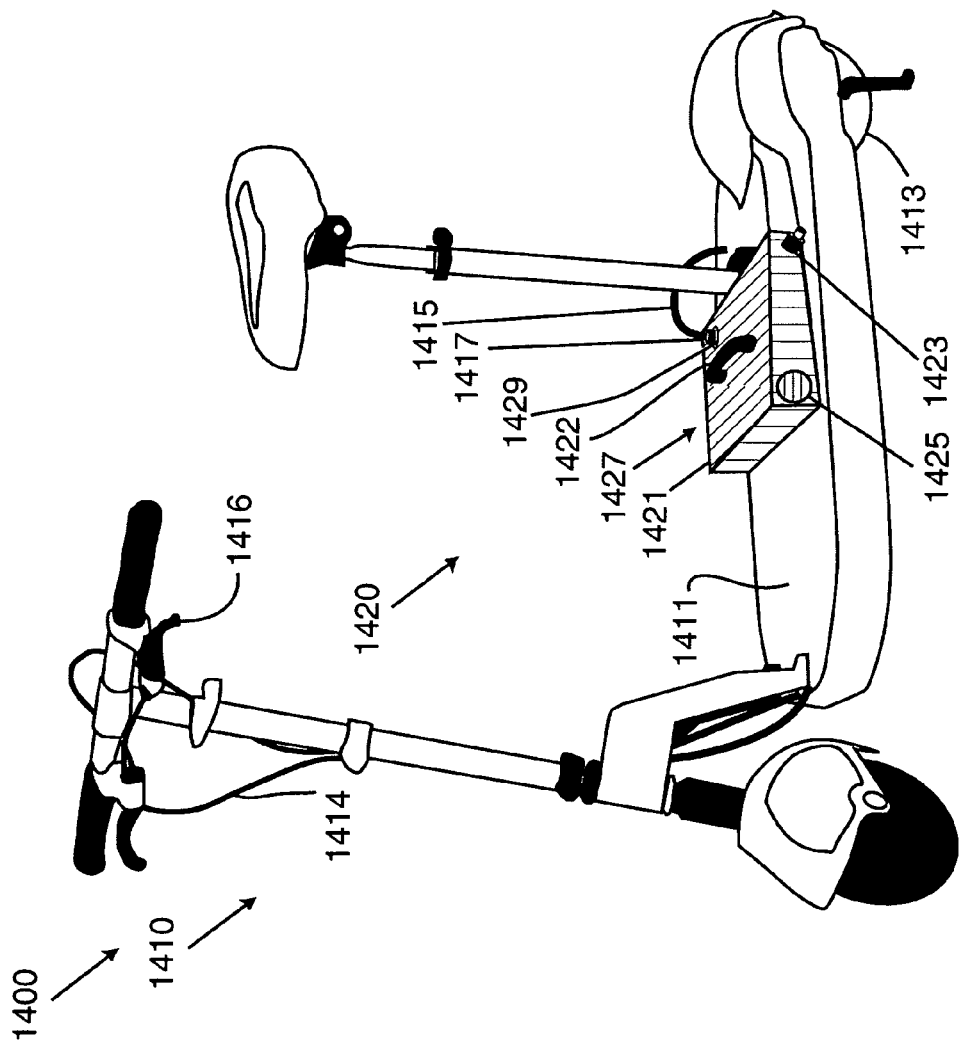
FIG. 14A is a perspective view of one embodiment of a removable integrated fuel cell system in a scooter.
Figure 15:
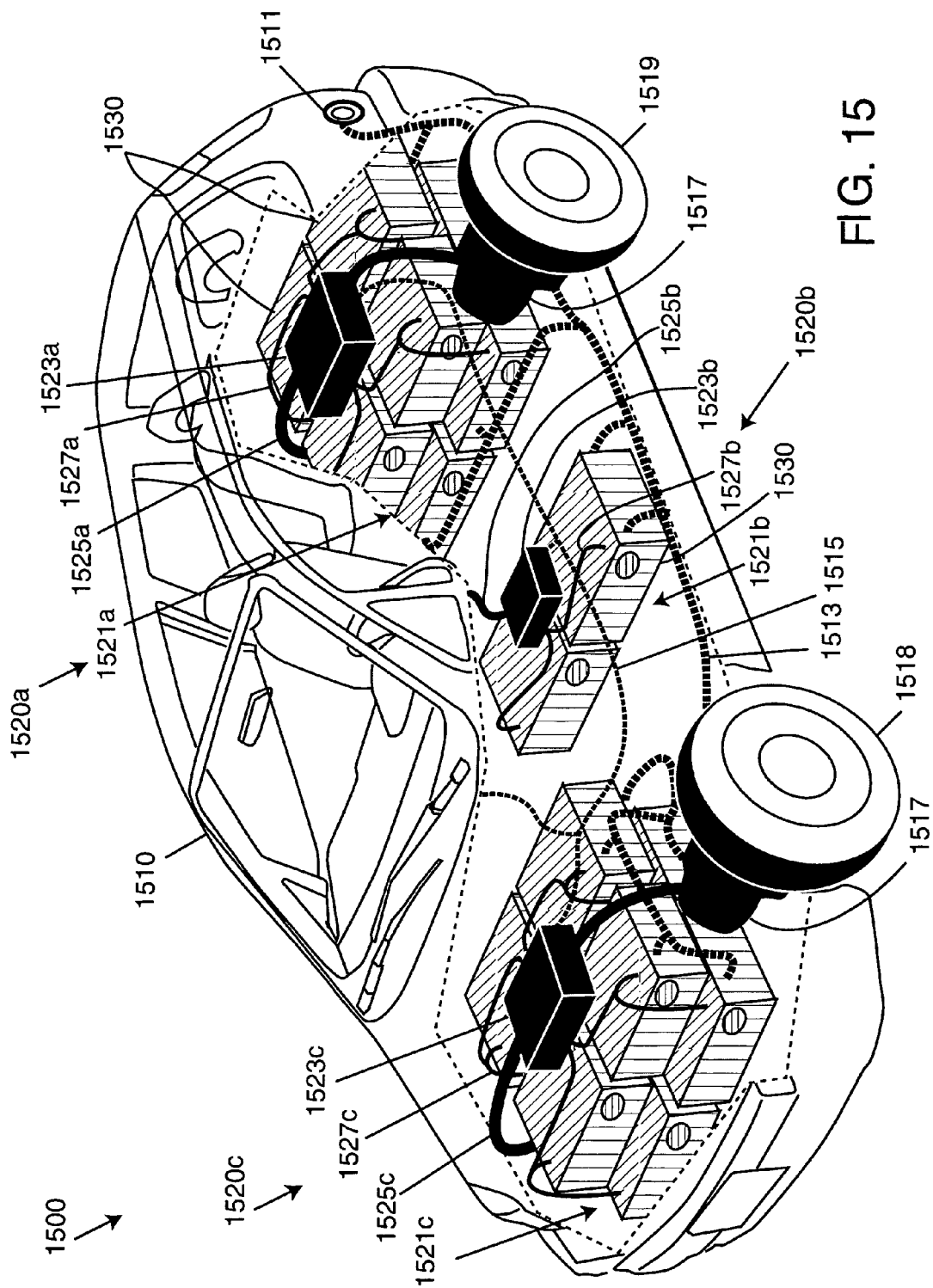
FIG. 15 is a perspective view of another embodiment integrated fuel cell system in an automobile.

Embodiments of integrated hydrogen-powered system within an electric power consuming device are illustrated, for example, in FIGS. 14A, 14B, and 15. FIG. 14A is a perspective view of one embodiment of a hydrogen-powered device 1400 that includes a scooter 1410 and a power module 1420. Scooter 1400 is an electric powered scooter having a throttle 1416, a control cable 1417, a power cable 1415 having a connector 1417, a powered wheel 1413, and a floorboard 1411. Power module 1420 includes an integrated hydrogen-powered electricity-producing system 1421, a hydrogen line connector 1423, an air inlet 1425, an exhaust 1427 (not illustrated), and a power output 1429.

Power module 1420 is releasably attachable to floorboard 1411, for example by using a latching mechanism or hinged cover, not shown, and connector 1417 releasably mates with power output 1429. A handle 1422 is also optionally provided for ease of moving module 1420. Application of force by a user to throttle 1416 signals, through control cable 1414, a required increase or decrease in motive power. The required electric power is then drained from system 1421 through the consumption of hydrogen by the system's fuel cells. With the exception of power module 1420 the mechanical and electrical components of scooter 1400 are similar to those of prior art battery-powered scooters, for example, the City Bug manufactured for Sharper Image Co.

System 1421 may, in various embodiments, be generally similar to any one or more of the embodiments of systems 100 or 100'. Alternatively, system 1421 may be generally similar to any one or more of the configurations 1100, 1200, or 1300.

When system 1421 is low or becomes depleted of hydrogen, module 1420 is detached from scooter 1400, as shown in the perspective view of FIG. 14B. Specifically, power plug 1417 is detached from power outlet 1429 and module 1420 is detached from floorboard 1411 by releasing a latch (not shown). Module 1420 is then carried to hydrogen supply line 1430 that has a line 1431 to a pressurized hydrogen source (not shown) and a coupling 1433. Coupling 1433 is attached to fuel inlet 1423, and module 1420 is charged. After charging, coupling 1433 is detached from inlet 1423, module 1420 is transported back to scooter 1410, the module is attached to floorboard 1411, and power plug 1417 is attached to power outlet 1429.

FIG. 15 is a perspective view of another embodiment integrated fuel cell system in an automobile 1500 having a body 1510 with front wheels 1518 and rear wheels 1519, and on which is mounted power modules 1520—a rear wheel drive module 1520a, an ancillary power module 1520b, and a front wheel drive module 1520c. Each power module 1520 includes one or more integrated hydrogen-powered electricity-producing systems 1530 interconnected through power supply cables 1527 to form an electrical configuration 1521, an electrical and oxidizer control unit 1523, and a power cable 1525. Power supply cables 1527 connect the electrical terminals of individual modules 1530 within each module 1520, as in, for example, one of configurations 1100, 1200, or 1300. Electrical and oxidizer control unit 1523 convert voltages and control power output to electric motors 1517 as well as control oxidizer supply, such as air flow, to each system 1530. In one embodiment, air flow to each system 1530 is provided by fans or air pumps (not shown) on each system. In another embodiment, air flow is provided by a centralized fan or air pumps and ducts (not shown).

Automobile 1500 also includes fuel supply and electrical and control line connections between modules 1520. A hydrogen line connector 1511 is connected to a fuel line 1513 that provides hydrogen to the hydrogen-storage unit of each system 1530, and a control cable 1515 connects the automotive controls (not shown) to the electrical and oxidizer control units 1523 for regulating the automobile's acceleration. Units 1523 alternatively regulate the automobile's breaking motions.

Power cable 1525 supplies the power from configuration 1521 to automobile 1500. Thus, for example, rear wheel drive module 1520a provides power to electric motors 1517 to drive rear wheels 1519, ancillary power module 1520b provides power to an air conditioner, radio, or other equipment within automobile 1500, and front wheel drive module 1520b provides power to electric motors 1517 to drive front wheels 1518.

While each system within automobile 1500 is indicated with the same reference number 1530, it is understood that this is meant to indicate that each system 1530 is an integrated hydrogen-powered electricity-producing system having an inlet for oxidizer, and inlet for fuel, an outlet for exhaust and electric power connections, and that the systems are not necessarily identical systems. In one embodiment of the present invention, for example, each system 1530 is identical with the others which may, for example, be generally the same as the systems described herein, such as system 100, 100', or 1420. In another embodiment, each system 1530 is one of a few different embodiments of systems 100, 100', or 1420, for example by including different fuel cell types, hydrogen-storage materials, or number of fuel cell stacks and hydrogen storage units. Importantly, the several systems 1530 are distributed about several locations within automobile 1500 to make efficient use of the space within the automobile 1500, and to distribute the weight efficiently in the automobile 1500.

Automobile 1500 is filled with fuel in a manner similar to conventional automobiles. When the amount of hydrogen is running low, a fuel supply line at a filling station is connected to connector 1511, and hydrogen under pressure is delivered to each system 1530. Fuel is supplied to the fuel cells from hydrogen stored within each system 1530, as described with reference to system 100. Air to each system 1530 is provided locally through vents, such as those described with reference to module 1420, taking in and exhausting gases locally. Alternatively, air or oxidizers can be supplied from single or multiple pump units (not shown) that are separate from each system 1530.

In alternative embodiments, automobile 1500 can have one module 1520 providing all of the automobiles power needs, or can have two modules or more than three modules. In another alternative embodiment, automobile 1500 can have one or more modules 1520 that may be removed for recharging in a similar manner to system 1420 on scooter 1400.

Thus in general, systems 100, 110' or configurations 1100, 1200, or 1300 may be used for applications including, but not limited to, space systems, robotic vehicles, remote controlled aircraft, commercial aircraft, submarines, all water vehicles including commercial vessels, vehicles including cars, trucks, scooters, mopeds, powered bicycles, motorcycles, golf-carts, wheel chairs, remote sensing systems, distributed power generation, back-packing, camping and motor home applications, portable power devices such as cellular telephones, CD and DVD players, video and digital cameras, laptop computers, handheld PDA's and GPS systems, gardening equipment including lawn mowers, edge trimmers, leaf blowers, flashlights, Christmas lights, hand held power tools vacuums and the like.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Those skilled in the art will recognize that other and further modifications may be made thereto without departing from the spirit of the invention, and it is intended to claim all such changes and modifications as fall within the scope of the invention. Thus, for example, while the present invention has been described in terms of hydrogen-storage materials that exothermically store hydrogen and endothermically release hydrogen, the hydrogen-storage unit of the present invention can include materials having different thermal characteristics, for example materials having no temperature change when uptaking or discharging hydrogen, or that endothermically store hydrogen and exothermically release hydrogen. Another alternative embodiment uses fuel storage assembly 10 to supply hydrogen for a combustion engine, and for the combustion engine to provide waste heat to the fuel storage unit by direct thermal contact. In either case, the heat required for a high flow rate of hydrogen from fuel storage assembly 10 is supplied from the waste heat of the power generator. Steps may be added or deleted to methods described within the scope of the present invention.

I claim:

1. An apparatus comprising:
   one or more fuel cell stacks each operable on hydrogen and having two fuel stack sides; and
   two or more housings each in contact with a substantial portion of at least one fuel cell stack side and having at least one internal volume for storing hydrogen and a passageway from said at least one internal volume to at least one of said one or more fuel cell stacks,
   where at least one of said one or more fuel cell stacks is disposed between two of said two or more housings,
   where the heat for releasing hydrogen from said at least one internal volume to said fuel cell stack is at least partially provided by heat generated in said fuel cell stack, and
   where said at least one or more fuel cell stacks is adapted to receive hydrogen only from an internal volume of said two or more housings.

2. The apparatus of claim 1, wherein said one or more fuel cell stacks is one fuel cell stack, wherein said two or more housings is two housings, and wherein said one fuel cell stack is disposed between said two housings.

3. The apparatus of claim 1, wherein each of said one or more fuel cell stacks is disposed between two of said two or more housings.

4. The apparatus of claim 1, further including thermal insulation surrounding at least a portion of said fuel cell stack and said two or more housings.

5. The apparatus of claim 4, wherein said thermal insulation substantially surrounds said fuel cell stack and said two or more housings and provides a gap for circulating a gas, and wherein the temperature of said two or more housings is controlled by circulating said gas through said gap.

6. The apparatus of claim 1, wherein at least one internal volume contains a hydrogen-storage material.

7. The apparatus of claim 1, wherein said at least one internal volume includes a plurality of interconnected cylindrical volumes.

8. The apparatus of claim 1, wherein said at least one internal volume includes two or more volumes, wherein a first one of said two or more volumes includes a first material for absorbing hydrogen, and wherein a second one of said two or more volumes includes a second material for absorbing hydrogen, where said first material and said second material are different types of materials.

9. The apparatus of claim 6, wherein said hydrogen-storage material comprises a hydride, a high-surface-area material, a hydrogen-containing compound, a metal, an alloy, or mixtures thereof.

10. The apparatus of claim 9, wherein said hydride is selected from the group consisting of an alanate, complex hydride, borohydride, ionic hydride, titanium hydride, aluminum hydride, magnesium hydride, and intermetallic hydrides.

11. The apparatus of claim 10, wherein said intermetallic hydride is a rare-earth-nickel-based hydride, zirconium-manganese-based hydride or titanium-iron-based hydride.

12. The apparatus of claim 9, wherein said hydrogen-containing compound is selected from the group consisting of amides and imides.

13. The apparatus of claim 9, wherein said hydrogen-containing compound includes a silicon-based hydrogen compound or a carbon-based hydrogen compound.

14. The apparatus of claim 6, wherein said hydrogen-storage material takes-up and releases hydrogen though corresponding exothermic and endothermic chemical reactions between constituent components.

15. The apparatus of claim 9, wherein said high-surface-area material is selected from the group consisting of activated carbon, carbon, nanofibers, nanotubes, metal organic frameworks, and high-surface area hydrogen adsorption materials.

16. The apparatus of claim 6, wherein said hydrogen-storage material is glass microspheres.

17. The apparatus of claim 6, wherein said hydrogen-storage materials is a mixture of a hydrogen-containing compound that releases hydrogen by exothermic reactions with a second compound.

18. The apparatus of claim 17, wherein said hydrogen-containing compound is a borohydride, and wherein said second compound is water.

19. The apparatus of claim 17, wherein said hydrogen-containing compound is an alkali-earth-aluminum hydride and wherein said second compound is ammonia.

20. The apparatus of claim 1, wherein said at least one internal volume stores compressed hydrogen gas.

21. The apparatus of claim 1, wherein said at least one internal volume stores liquid hydrogen.

22. The apparatus of claim 1, further including a vacuum-tight container surrounding said fuel cell and said two or more housings, and a gas source to provide a controllable pressure to said vacuum-tight container.

23. The apparatus of claim 1, further including a vacuum-tight container placed between said fuel cell and said two or more housings, and a gas source to provide a controllable pressure to said vacuum-tight container.

24. The apparatus of claim 6, wherein said at least one of said at least one internal volume further includes a spring.

25. The apparatus of claim 6, wherein said hydrogen-storage material includes at least two different types of hydrogen-storage materials.

26. The apparatus of claim 6, wherein said hydrogen-storage material is a first material, and wherein at least one of said at least one internal volume further includes a second material having a higher thermal conductivity than said first material.

27. The apparatus of claim 26, wherein said second material is selected from the group consisting of a sintered metal, a metal foam, and a metal wool.

28. The apparatus of claim 26, wherein said second material is selected from the group consisting of a sintered metal, a metal foam, a metal wool, a carbon foam, a metal coated carbon fiber, and a carbon wool.

29. The apparatus of claim 26, wherein said second material substantially covers each of said passageway from said at least one internal volume.

30. The apparatus of claim 6, said housing further including a porous material within said passageway.

31. The apparatus of claim 1, wherein said one or more fuel cell stacks is two or more fuel cell stacks.

32. The apparatus of claim 1, where at least one of said one or more fuel cell stacks has a fuel inlet consisting of one or more fuel inlets, and where each of said one or more fuel inlets of at least one of said one or more fuel cell stacks is connectable only to said at least one internal volume.

33. The apparatus of claim 1, where a substantial portion of the heat generated in at least one of said one or more fuel cell stacks is generated from the consumption of hydrogen from said at least one internal volume.

34. The apparatus of claim 1, where substantially all of the hydrogen to operate at least one of said one or more fuel cell stacks is provided from said at least one internal volume.

35. A method of operating the apparatus of claim 1 from a first amount of hydrogen, said method comprising:
storing a first amount of hydrogen in said at least one internal volume; and
operating at least one of said one or more fuel cell stacks from said first amount of hydrogen.

36. An apparatus comprising:
at least one fuel cell stack operable on hydrogen and having two sides;
two or more housings each in contact with a substantial portion of one of said two sides and having at least one internal volume for storing hydrogen and a passageway from said at least one internal volume to said fuel cell stack;
where at least one of said at least one fuel cell stack is disposed between two of said two or more housings, and
a device to control heat loss from said fuel cell stack and said two or more housings,
where the heat for releasing hydrogen from said at least one internal volume to said fuel cell stack is at least partially provided by thermal conduction of heat generated in said fuel cell stack, and
where said at least one fuel cell stack is adapted to receive hydrogen only from an internal volume of said two or more housings.

37. The apparatus of claim 36, wherein said at least one fuel cell stack is one fuel cell stack, wherein said two or more housings is two housings, and wherein said one fuel cell stack is disposed between said two housings.

38. The apparatus of claim 36, wherein each of said at least one fuel cell stack is disposed between two of said two or more housings.

39. The apparatus of claim 36, wherein said device includes thermal insulation surrounding at least a portion of said fuel cell and said two or more housings.

40. The apparatus of claim 39, wherein said thermal insulation substantially surrounds said fuel cell and said two or more housings and provides a gap for circulating a gas, and wherein the temperature of said two or more housings is controlled by circulating said gas through said gap.

41. The apparatus of claim 36, wherein said device includes a vacuum-tight container surrounding said fuel cell and said two or more housings, and a gas source to provide a controllable pressure to said vacuum-tight container.

42. The apparatus of claim 36, further including a vacuum-tight container placed between said fuel cell and said two or more housings, and a gas source to provide a controllable pressure to said vacuum-tight container.

43. The apparatus of claim 36, wherein at least one of said at least one internal volume contains a hydrogen-storage material.

44. The apparatus of claim 36, wherein said at least one fuel cell stack is two or more fuel cell stacks.

45. An electric power system for a device comprising:
two or more electric power modules, where at least two of said two or more electric power modules includes
at least one fuel cell stack operable on hydrogen, and
at least one housing in contact with said fuel cell and having one or more internal volumes for storing hydrogen and an outlet to provide hydrogen released from said one or more internal volumes to said at least one fuel cell stack,
where the heat for releasing hydrogen is at least partially provided by said fuel cell,
where said at last one fuel cell stack is adapted to receive hydrogen only from an internal volume of said at least one housing, and
wiring to provide power from said two or more electric power modules,
wherein each of said at least one fuel cell stack has two fuel stack sides,
where each of said at least one housing is two or more housings each in contact with a substantial portion of at least one fuel cell stack side and having at least one internal volume for storing hydrogen and a passageway from said at least one internal volume to at least one of said one or more fuel cell stacks, and
where at least one of said at least one fuel cell stack is disposed between two of said two or more housings.

46. The electric power system of claim 45, wherein at least one of said two or more electric power modules further includes thermal insulation.

47. The electric power system of claim 45, wherein at least one of said one or more internal volumes contains a hydrogen-storage material.

48. The electric power system of claim 45, wherein at least one of said two or more electric power modules is removably attached to said device.

49. The electric power system of claim 48, wherein said device is a scooter.

50. The electric power system of claim 45, wherein at least one of said two or more electric power modules is fillable within said device.

51. The electric power system of claim 48, wherein said device is an automobile.

52. The electric power system of claim 45, where said wiring connects the power output of at least two of said two or more electric power modules.

53. The apparatus of claim 45, where at least one of said at least one fuel cell stack has a fuel inlet consisting of one or more fuel inlets, and where each of said one or more fuel inlets of at least one of said one or more fuel cell stacks is connectable only to said at least one of said one or more internal volumes.

54. The apparatus of claim 45, where a substantial portion of the heat generated in at least one of said at least one fuel cell stack is generated from the consumption of hydrogen from at least one of said one or more internal volumes.

55. The apparatus of claim 45, where, for at least one of said two or more electric power modules, substantially all of the hydrogen to operate said at least one fuel cell stack is provided from said one or more internal volumes.

\* \* \* \* \*